(12) United States Patent
Wei et al.

(10) Patent No.: US 11,310,051 B2
(45) Date of Patent: *Apr. 19, 2022

(54) BLOCKCHAIN-BASED DATA AUTHORIZATION METHOD AND APPARATUS

(71) Applicant: Advanced New Technologies Co., Ltd., Grand Cayman (KY)

(72) Inventors: Changzheng Wei, Hangzhou (CN); Ying Yan, Hangzhou (CN); Hui Zhang, Hangzhou (CN); Yujun Peng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,320

(22) Filed: Jan. 31, 2020

(65) Prior Publication Data

US 2020/0169407 A1 May 28, 2020

Related U.S. Application Data

(63) Continuation of application No. PCT/CN2020/072224, filed on Jan. 15, 2020.

(51) Int. Cl.
*H04L 29/06* (2006.01)
*H04L 9/32* (2006.01)
(Continued)

(52) U.S. Cl.
CPC .......... *H04L 9/3234* (2013.01); *G06F 21/57* (2013.01); *G06F 21/602* (2013.01);
(Continued)

(58) Field of Classification Search
CPC ......... H04L 63/10; H04L 9/32; H04L 9/3234; H04L 9/30; H04L 63/101; H04L 9/0643; H04L 2209/38; G06F 21/602
See application file for complete search history.

(56) References Cited

U.S. PATENT DOCUMENTS 6,947,556 B1 9/2005 Matyas, Jr. et al.
7,805,327 B1 9/2010 Schulz et al.
(Continued)

FOREIGN PATENT DOCUMENTS

CN 103034813 4/2013
CN 103765452 4/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Khang Do
(74) *Attorney, Agent, or Firm* — Fish & Richardson P.C.

(57) ABSTRACT

One or more implementations of the present specification provide a blockchain-based data authorization method and apparatus. The method can include receiving, by a blockchain node, an authentication transaction submitted by a privacy computing platform, where the authentication transaction queries whether a data user has obtained authorization of target data possessed by a data owner, and in response to determining that the data user has obtained authorization of the target data, executing, by the blockchain node, a smart contract invoked by the authentication transaction to provide an authorization token to the privacy computing platform that instructs the privacy computing platform to obtain the target data, and send a computational result of one or more predetermined computational operations based on the target data to the data user.

18 Claims, 13 Drawing Sheets

(51) Int. Cl.
  *G06F 21/60* (2013.01)
  *H04L 9/30* (2006.01)
  *G06F 21/57* (2013.01)
  *H04L 9/06* (2006.01)

(52) U.S. Cl.
  CPC .......... *H04L 9/0637* (2013.01); *H04L 9/0643* (2013.01); *H04L 9/30* (2013.01); *H04L 63/101* (2013.01); *H04L 2209/38* (2013.01)

(56) References Cited

U.S. PATENT DOCUMENTS

| | | | |
|---|---|---|---|
| 9,674,223 | B1 | 6/2017 | Yu |
| 9,838,203 | B1 | 12/2017 | Kisley et al. |
| 10,248,783 | B2 | 4/2019 | Costa Faidella |
| 10,257,206 | B2 | 4/2019 | He et al. |
| 10,469,479 | B2 | 11/2019 | Appiah et al. |
| 10,511,593 | B2 | 12/2019 | Appiah et al. |
| 10,893,123 | B2* | 1/2021 | Chen ................ H04L 67/32 |
| 11,057,180 | B2 | 7/2021 | Guan |
| 2004/0078258 | A1 | 4/2004 | Schulz et al. |
| 2004/0083448 | A1 | 4/2004 | Schulz et al. |
| 2004/0187089 | A1 | 9/2004 | Schulz |
| 2005/0223412 | A1 | 10/2005 | Nadalin et al. |
| 2006/0064464 | A1* | 3/2006 | Kakivaya ............ H04L 1/1848 709/206 |
| 2014/0359348 | A1* | 12/2014 | Volvovski ................ G06F 3/06 714/6.22 |
| 2015/0172283 | A1 | 6/2015 | Omnes et al. |
| 2015/0193263 | A1 | 7/2015 | Nayyar et al. |
| 2015/0228018 | A1 | 8/2015 | Richman |
| 2015/0381575 | A1* | 12/2015 | Bhargav-Spantzel ............ H04L 63/0861 713/168 |
| 2016/0342987 | A1* | 11/2016 | Thomas ................ G06Q 40/00 |
| 2017/0081796 | A1 | 3/2017 | Belveal |
| 2017/0155515 | A1 | 6/2017 | Androulaki |
| 2017/0169250 | A1 | 6/2017 | White |
| 2017/0221029 | A1* | 8/2017 | Lund ..................... G06Q 50/188 |
| 2017/0300627 | A1 | 10/2017 | Giordano |
| 2018/0060496 | A1 | 3/2018 | Bulleit |
| 2018/0081529 | A1 | 3/2018 | Zhang |
| 2018/0152442 | A1 | 5/2018 | Buldas et al. |
| 2018/0183809 | A1 | 6/2018 | Vadura |
| 2018/0204213 | A1* | 7/2018 | Zappier ................. H04L 9/0819 |
| 2018/0227119 | A1 | 8/2018 | Bibera et al. |
| 2018/0239897 | A1 | 8/2018 | Ventura |
| 2018/0240085 | A1 | 8/2018 | Balachov |
| 2018/0276626 | A1 | 9/2018 | Laiben |
| 2018/0314809 | A1 | 9/2018 | Mintz et al. |
| 2018/0293556 | A1 | 10/2018 | Hyun et al. |
| 2018/0309567 | A1 | 10/2018 | Wooden |
| 2018/0315046 | A1 | 11/2018 | Joao |
| 2019/0028277 | A1 | 1/2019 | Jayachandran et al. |
| 2019/0043043 | A1* | 2/2019 | Saraniecki ............ G06Q 20/382 |
| 2019/0080392 | A1 | 3/2019 | Youb et al. |
| 2019/0081796 | A1* | 3/2019 | Chow ..................... H04L 9/30 |
| 2019/0116038 | A1 | 4/2019 | Sprague |
| 2019/0140822 | A1 | 5/2019 | Xie et al. |
| 2019/0164157 | A1 | 5/2019 | Balarannan et al. |
| 2019/0171744 | A1* | 6/2019 | Ananthapur Bache ... H04L 9/14 |
| 2019/0173854 | A1* | 6/2019 | Beck ................... H04L 9/3239 |
| 2019/0179801 | A1 | 6/2019 | Jang |
| 2019/0197532 | A1 | 6/2019 | Jayachandran et al. |
| 2019/0205563 | A1* | 7/2019 | Gonzales, Jr. .......... G06F 21/62 |
| 2019/0205894 | A1* | 7/2019 | Gonzales, Jr. ......... G06Q 20/42 |
| 2019/0207750 | A1 | 7/2019 | Harvey |
| 2019/0207751 | A1 | 7/2019 | Harvey |
| 2019/0229921 | A1* | 7/2019 | Pulsifer ................. H04L 9/088 |
| 2019/0251552 | A1 | 8/2019 | Kurian |
| 2019/0268139 | A1 | 8/2019 | Kurian |
| 2019/0294817 | A1* | 9/2019 | Hennebert ............ H04L 9/0861 |
| 2019/0294822 | A1* | 9/2019 | Hennebert ........... G06F 21/6254 |
| 2019/0295202 | A1* | 9/2019 | Mankovskii .......... H04L 9/3239 |
| 2019/0334700 | A1* | 10/2019 | Callan ................... H04L 9/0643 |
| 2019/0340352 | A1 | 11/2019 | Peeters |
| 2019/0342077 | A1* | 11/2019 | McMurdie ............ H04L 9/3263 |
| 2019/0347725 | A1* | 11/2019 | de Jong .................. G06Q 20/02 |
| 2019/0354693 | A1* | 11/2019 | Yoon ................... G06F 21/6245 |
| 2019/0358515 | A1* | 11/2019 | Tran ...................... G06Q 20/382 |
| 2019/0362352 | A1 | 11/2019 | Kunnawat |
| 2019/0372776 | A1 | 12/2019 | Kroneisen et al. |
| 2019/0394179 | A1* | 12/2019 | Androulaki ......... H04L 63/0471 |
| 2020/0004737 | A1 | 1/2020 | Qiu |
| 2020/0005296 | A1 | 1/2020 | Green |
| 2020/0013046 | A1 | 1/2020 | Joao |
| 2020/0021439 | A1 | 1/2020 | Sato |
| 2020/0026834 | A1 | 1/2020 | Vinnadalal |
| 2020/0027169 | A1 | 1/2020 | Valencia |
| 2020/0028703 | A1 | 1/2020 | Homsi |
| 2020/0034457 | A1* | 1/2020 | Brody .................. G06Q 20/382 |
| 2020/0036519 | A1 | 1/2020 | Bitauld et al. |
| 2020/0045019 | A1 | 2/2020 | Huang |
| 2020/0067907 | A1* | 2/2020 | Avetisov ............. G06F 16/9014 |
| 2020/0074518 | A1 | 3/2020 | Kunnaraswanny |
| 2020/0082933 | A1 | 3/2020 | Lu |
| 2020/0084097 | A1 | 3/2020 | Marks |
| 2020/0118110 | A1 | 4/2020 | Coverstone |
| 2020/0118131 | A1 | 4/2020 | Diriye |
| 2020/0119905 | A1 | 4/2020 | Revankar |
| 2020/0145229 | A1 | 5/2020 | Li |
| 2020/0210996 | A1* | 7/2020 | Edwards ............ G06Q 20/3672 |
| 2020/0219093 | A1 | 7/2020 | Malhotra |
| 2020/0226285 | A1 | 7/2020 | Bulleit |
| 2020/0227160 | A1 | 7/2020 | Youngblood |
| 2020/0272619 | A1 | 8/2020 | Alferov |
| 2020/0280443 | A1 | 9/2020 | Simons |
| 2020/0287874 | A1* | 9/2020 | Bertram ................ H04L 9/3234 |
| 2020/0302429 | A1 | 9/2020 | Anton |
| 2020/0304474 | A1* | 9/2020 | Kisko ................... H04L 9/0637 |
| 2020/0311052 | A1 | 10/2020 | Takahashi |
| 2020/0349261 | A1 | 11/2020 | Koorella et al. |
| 2020/0364358 | A1* | 11/2020 | Karia ..................... G06N 5/043 |
| 2020/0380090 | A1 | 12/2020 | Marion |
| 2021/0097795 | A1* | 4/2021 | Manchovski ............ H04L 9/088 |
| 2021/0216647 | A1* | 7/2021 | Sarhaddar ............ G06F 21/604 |

FOREIGN PATENT DOCUMENTS

| | | |
|---|---|---|
| CN | 108235772 | 6/2016 |
| CN | 106600405 | 4/2017 |
| CN | 107391944 | 11/2017 |
| CN | 107453865 | 12/2017 |
| CN | 107483211 | 12/2017 |
| CN | 108985089 | 2/2018 |
| CN | 107942718 | 4/2018 |
| CN | 108234515 | 6/2018 |
| CN | 108632268 | 10/2018 |
| CN | 108681898 | 10/2018 |
| CN | 108885160 | 11/2018 |
| CN | 108932297 | 12/2018 |
| CN | 109033846 | 12/2018 |
| CN | 109034833 | 12/2018 |
| CN | 109067791 | 12/2018 |
| CN | 109190410 | 1/2019 |
| CN | 109214197 | 1/2019 |
| CN | 109274640 | 1/2019 |
| CN | 109344647 | 2/2019 |
| CN | 109347941 | 2/2019 |
| CN | 109450910 | 3/2019 |
| CN | 109478222 | 3/2019 |
| CN | 109635585 | 4/2019 |
| CN | 109636503 | 4/2019 |
| CN | 109639643 | 4/2019 |
| CN | 109949155 | 6/2019 |
| CN | 109977697 | 7/2019 |
| CN | 110011996 | 7/2019 |
| CN | 110032865 | 7/2019 |
| CN | 110060162 | 7/2019 |
| CN | 110457875 | 11/2019 |
| CN | 110473094 | 11/2019 |
| CN | 110473096 | 11/2019 |
| EP | 3547203 | 2/2019 |
| GN | 109284197 | 1/2019 |

(56) References Cited

FOREIGN PATENT DOCUMENTS

| | | |
|---|---|---|
| GN | 109509518 | 3/2019 |
| GN | 109978571 | 7/2019 |
| TW | 201724825 | 7/2017 |
| TW | 201730825 | 9/2017 |
| TW | 201730829 | 9/2017 |
| TW | 201732666 | 9/2017 |
| TW | 201732700 | 9/2017 |
| TW | 201812674 | 4/2018 |
| TW | M561279 | 6/2018 |
| TW | 201824108 | 7/2018 |
| TW | 201828200 | 8/2018 |
| TW | 201842476 | 12/2018 |
| TW | 201909002 | 3/2019 |
| TW | 201909084 | 3/2019 |
| TW | 201914254 | 4/2019 |
| WO | WO 2019078879 | 4/2019 |

OTHER PUBLICATIONS

Nakamoto, "Bitcoin: A Peer-to-Peer Electronic Cash System," www.bitcoin.org, 2005, 9 pages.

Jesus et al., "A Survey of How to Use Blockchain to Secure Internet of Things and the Stalker Attack", Article ID 9675050, 27 pages, 2018.

Jin et al., "Bspace: a group workspace over the Ethereum blockchain with off-blockchain storage", 9(40): 53-60, 2019.

Khezr et at, "Blockchain Technology in Healthcare: A Comprehensive Review and Directions for Future Research,", 9(9): 28 pages, 2019.

International Search Report and Written Opinion in International Application No. PCT/CN2020/072038, dated Apr. 26, 2020, 19 pages (with Machine Translation).

International Search Report and Written Opinion in International Application No. PCT/CN2020/072153, dated May 8, 2020, 18 pages (with Machine Translation).

International Search Report and Written Opinion in International Application No. PCT/CN2020/072224, dated Apr. 24, 2020, 25 pages (with Machine Translation).

Gallo et al., "BlockSee: Blockchain for IoT Video Surveillance in Smart Cities," Jun. 2018, 2018 IEEE International Conference on Environment and Electrical Engineering and 2018 IEEE Industrial and Commercial Power Systems Europe (EEEIC/I&CPS Europe).

* cited by examiner

BLOCKCHAIN-BASED DATA AUTHORIZATION METHOD AND APPARATUS

CROSS-REFERENCE TO RELATED APPLICATIONS

This application is a continuation of PCT Application No. PCT/CN2020/072224, filed on Jan. 15, 2020, which claims priority to Chinese Patent Application No. 201910703811.0, filed on Jul. 31, 2019, and each application is hereby incorporated by reference in its entirety.

TECHNICAL FIELD

One or more implementations of the present specification relate to the field of blockchain technologies, and in particular, to a blockchain-based data authorization method and apparatus.

BACKGROUND

The blockchain technology (also referred to as a distributed ledger technology) is a decentralized distributed database technology. The blockchain technology is characterized by decentralization, openness and transparency, non-tampering, and trustworthiness, and is applicable to a plurality of application scenarios requiring high data reliability.

SUMMARY

In view of this, one or more implementations of the present specification provide a blockchain-based data authorization method and apparatus.

To achieve the previous objective, one or more implementations of the present specification provide the following technical solutions:

According to a first aspect of one or more implementations of the present specification, a blockchain-based data authorization method is provided, including: receiving, by a blockchain node, an authentication transaction submitted by a privacy computing platform, where the authentication transaction is used to query whether a data user has obtained authorization for target data held by a data owner; and executing, by the blockchain node, a data authorization smart contract invoked for the authentication transaction, where the data authorization smart contract is used to: when it is confirmed that the data user has obtained the authorization, provide an authorization token for the privacy computing platform to instruct the privacy computing platform to obtain the target data, and send, to the data user, at least one of the target data or an operation result obtained after a predetermined operation is performed on the target data.

According to a second aspect of one or more implementations of the present specification, a blockchain-based data authorization method is provided, including: receiving, by a privacy computing platform, a data acquisition request initiated by a data user, where the data acquisition request corresponds to target data held by a data owner; submitting, by the privacy computing platform, an authentication transaction to a blockchain, where the authentication transaction is used to query whether the data user has obtained authorization for the target data; obtaining, by the privacy computing platform, an authorization token issued based on a data authorization smart contract invoked by the authentication transaction; and obtaining, by the privacy computing platform, the target data when the authorization token indicates that the data user has obtained the authorization for the target data, to return, to the data user, at least one of the target data or an operation result obtained after a predetermined operation is performed on the target data.

According to a third aspect of one or more implementations of the present specification, a blockchain-based data authorization apparatus is provided, including: a receiving unit, configured to enable a blockchain node to receive an authentication transaction submitted by a privacy computing platform, where the authentication transaction is used to query whether a data user has obtained authorization for target data held by a data owner; and an execution unit, configured to enable the blockchain node to execute a data authorization smart contract invoked for the authentication transaction, where the data authorization smart contract is used to: when it is confirmed that the data user has obtained the authorization, provide an authorization token for the privacy computing platform to instruct the privacy computing platform to obtain the target data, and send, to the data user, at least one of the target data or an operation result obtained after a predetermined operation is performed on the target data.

According to a fourth aspect of one or more implementations of the present specification, a blockchain-based data authorization apparatus is provided, including: a receiving unit, configured to enable a privacy computing platform to receive a data acquisition request initiated by a data user, where the data acquisition request corresponds to target data held by a data owner; a query unit, configured to enable the privacy computing platform to submit an authentication transaction to a blockchain, where the authentication transaction is used to query whether the data user has obtained authorization for the target data; an acquisition unit, configured to enable the privacy computing platform to obtain an authorization token issued based on a data authorization smart contract invoked by the authentication transaction; and a returning unit, configured to enable the privacy computing platform to obtain the target data when the authorization token indicates that the data user has obtained the authorization for the target data, to return, to the data user, at least one of the target data or an operation result obtained after a predetermined operation is performed on the target data.

According to a fifth aspect of one or more implementations of the present specification, an electronic device is provided, including: a processor; and a memory, configured to store a processor executable instruction, wherein the processor implements the method according to the first aspect by running the executable instruction.

According to a sixth aspect of one or more implementations of the present specification, a computer readable storage medium is provided. A computer instruction is stored in the computer readable storage medium. When a processor executes the instruction, the steps of the method according to the first aspect are implemented.

According to a seventh aspect of one or more implementations of the present specification, an electronic device is provided, including: a processor; and a memory, configured to store a processor executable instruction, wherein the processor implements the method according to the second aspect by running the executable instruction.

According to an eighth aspect of one or more implementations of the present specification, a computer readable storage medium is provided. A computer instruction is stored in the computer readable storage medium. When a processor executes the instruction, the steps of the method according to the second aspect are implemented.

DESCRIPTION OF IMPLEMENTATIONS

Example implementations will be described here in detail, and examples of the implementations are shown in the accompanying drawings. When the following description relates to the accompanying drawings, the same number in different drawings represents the same element or similar elements, unless otherwise stated. The implementations described in the following example implementations do not represent all implementations consistent with one or more implementations of the present specification. On the contrary, they are merely examples of devices and methods consistent with some aspects of one or more implementations described in detail in the appended claims and the present specification.

It is worthwhile to note that the steps of the corresponding method are not necessarily performed in the order shown and described in the present specification in other implementations. In some other implementations, the method can include more or less steps than those described in the present specification. In addition, the steps described in the present specification can be divided to a plurality of steps for description in other implementations; the plurality of steps described in the present specification can also be combined to a single step for description in other implementations.

Figure 1:
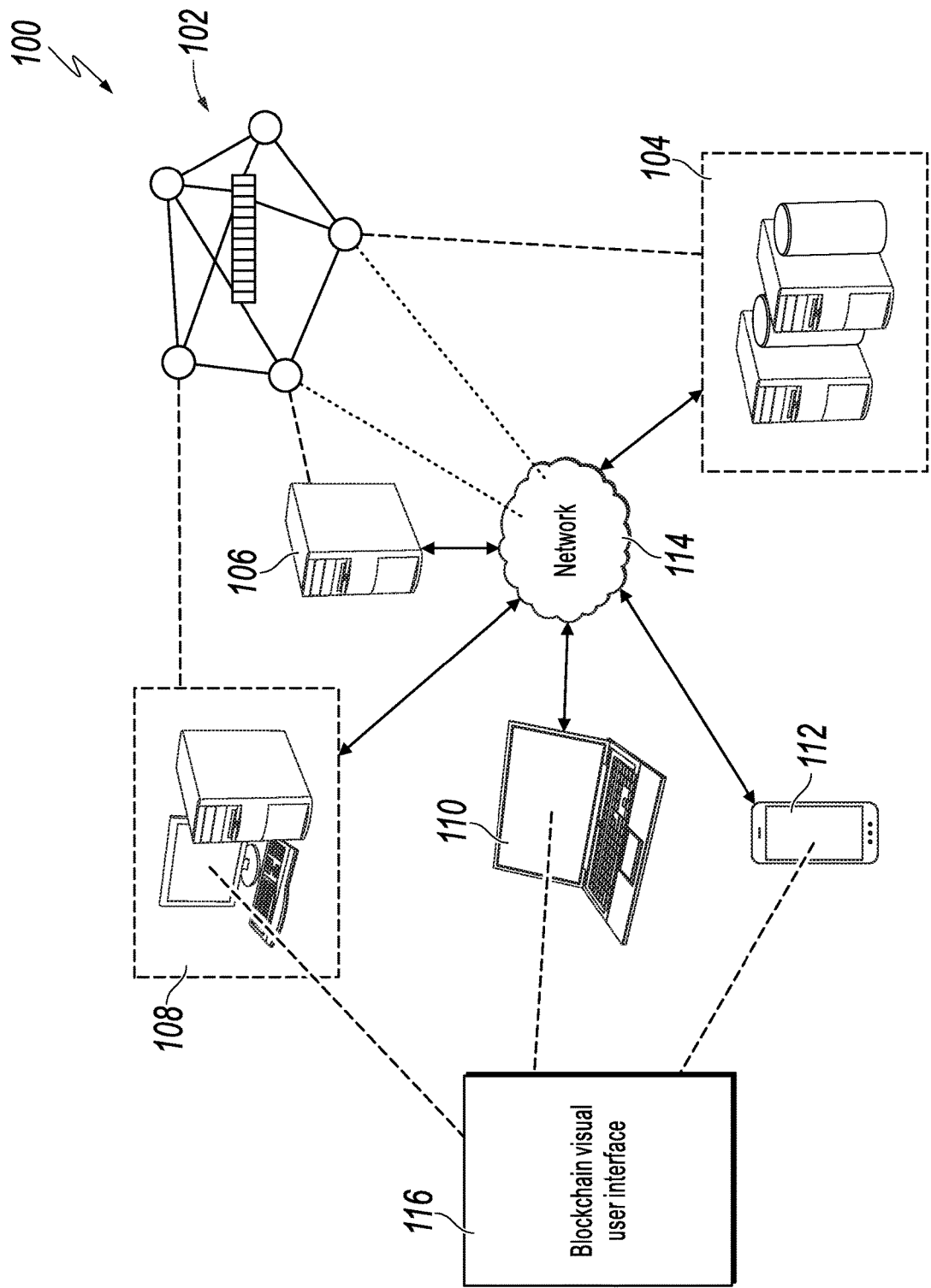
FIG. 1 is a schematic diagram illustrating an example environment, according to an example implementation.

FIG. 1 is a schematic diagram illustrating an example environment, according to an example implementation. As shown in FIG. 1, an example environment 100 allows an entity to participate in a blockchain network 102. The blockchain network 102 can be a public blockchain network, a private blockchain network, or a consortium blockchain network. Example environment 100 can include computing devices 104, 106, 108, 110, 112, and a network 114. In an implementation, the network 114 can include a local area network (LAN), a wide area network (WAN), the Internet, or a combination thereof, and the network 114 can be connected to a website, user equipment (for example, a computing device), and a back end system. In an implementation, the network 114 can be accessed by using at least one of a wired communication method or a wireless communication method.

In some cases, the computing devices 106 and 108 can be nodes (not shown) in a cloud computing system, or each of the computing devices 106 and 108 can be a separate cloud computing system, including a plurality of computers interconnected by a network and operating as a distributed processing system.

In an implementation, the computing devices 104 to 108 can run any proper computing system so that the computing devices can function as nodes in the blockchain network 102. For example, the computing devices 104 to 108 can include but are not limited to servers, desktop computers, laptops, tablet computing devices, and smart phones. In an implementation, the computing devices 104 to 108 can belong to relevant entities and be used to implement corresponding services. For example, the services can be used to manage transactions of one or more entities.

In an implementation, the computing devices 104 to 108 respectively store a blockchain ledger corresponding to the blockchain network 102. The computing device 104 can be (or include) a network server for providing a browser function. The network server can provide, based on the network 114, visual information related to the blockchain network 102. In some cases, the computing device 104 may not participate in block verification. Instead, the computing device 104 listens to the blockchain network 102 to determine when other nodes (for example, the nodes can include the computing devices 106 to 108) reach a consensus, thereby generating a corresponding blockchain visual user interface.

In an implementation, the computing device 104 can receive a request initiated by a client device (such as the computing device 110 or the computing device 112) against the blockchain visual user interface. In some cases, the node in the blockchain network 102 can also serve as a client device. For example, a user of the computing device 108 can send the previous request to the computing device 104 by using a browser running on the computing device 108.

In response to the previous request, the computing device 104 can generate the blockchain visual user interface (such as a web page) based on the stored blockchain ledger and send the generated blockchain visual user interface to the requesting client device. If the blockchain network 102 is a private or consortium blockchain network, the request for the blockchain visual user interface can include user authorization information. Before the blockchain visual user interface is generated and the user authorization information is sent to the requesting client device, the computing device 104 can verify the user authorization information, and the request can be returned to the corresponding blockchain visual user interface when the user authorization information passes the verification.

The blockchain visual user interface can be displayed in a client device (for example, in a user interface 116 shown in FIG. 1). When the blockchain ledger is updated, display content of user interface 116 can also be updated accordingly. In addition, interaction between a user and the user interface 116 can result in a request for another user interface, for example, displaying a block list, block details, a transaction list, transaction details, an account list, account details, a contract list, contract details, or a search result page resulting from a user's search for the blockchain network.

Figure 2:
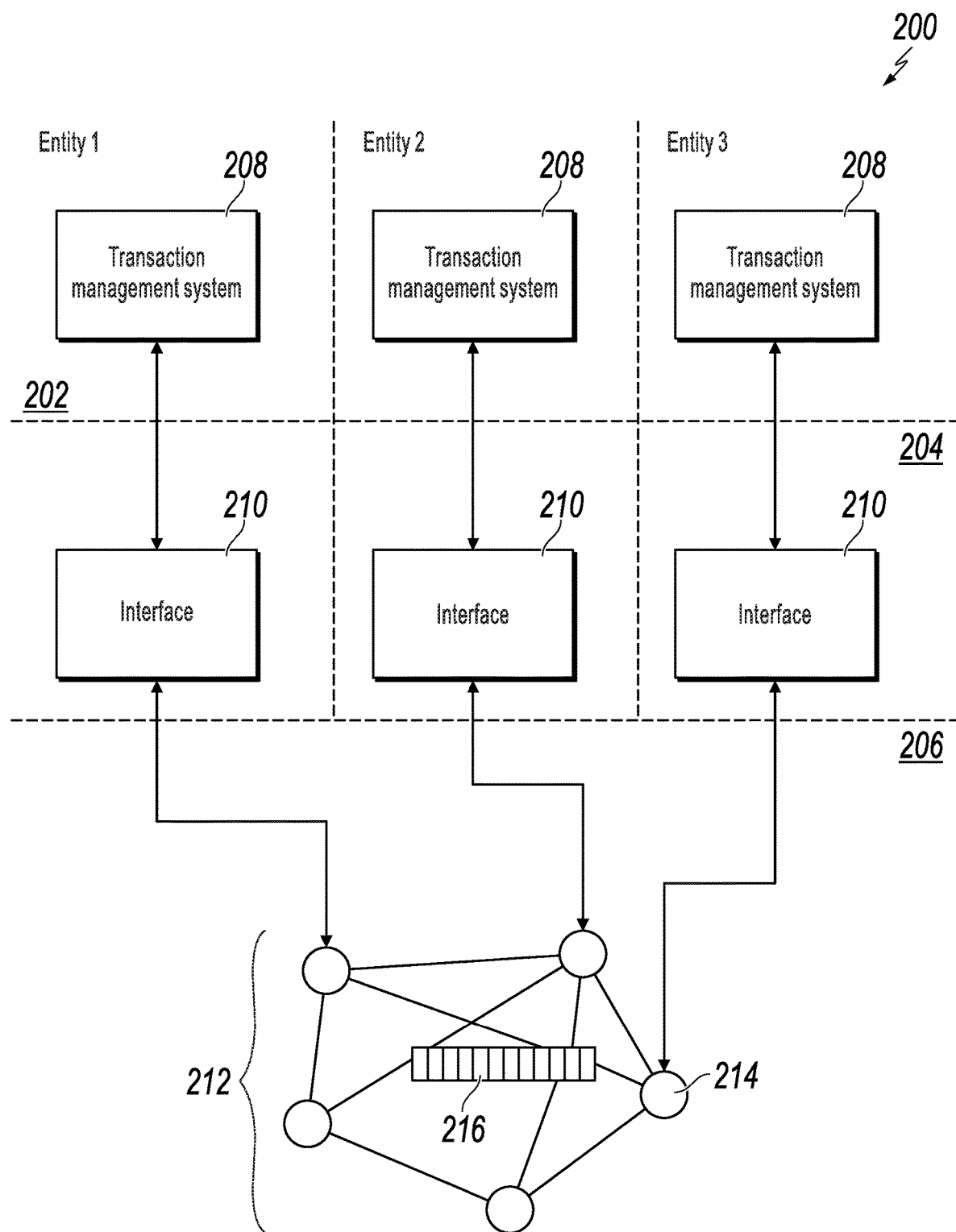
FIG. 2 is a schematic diagram illustrating a conceptual architecture, according to an example implementation.

FIG. 2 is a schematic diagram illustrating a conceptual architecture, according to an example implementation. As shown in FIG. 2, the conceptual architecture 200 includes a physical layer 202, a hosting service layer 204, and a blockchain network layer 206. For example, the physical layer 202 can include three entities: an entity 1, an entity 2, and an entity 3. Each entity has its own transaction management system 208.

In an implementation, the hosting service layer 204 can include an interface 210 corresponding to each transaction management system 208. For example, each transaction management system 208 communicates with the corresponding interface 210 over a network (such as the network 114 in FIG. 1) by using a protocol (such as Hyper Text Transfer Protocol Secure (HTTPS)). In some examples, each interface 210 can provide a communication connection between the corresponding transaction management system 208 and the blockchain network layer 206. To be specific, the interface 210 can communicate with the blockchain network 212 of the blockchain network layer 206. In some examples, communication between the interface 210 and the blockchain network layer 206 can be implemented by using Remote Procedure Calls (RPCs). In some examples, the interface 210 can provide the transaction management system 208 with an API interface for accessing the blockchain network 212.

As described in the present specification, the blockchain network 212 is provided in the form of a peer-to-peer network. The peer-to-peer network includes a plurality of nodes 214, which are respectively configured to permanently store a blockchain ledger 216 formed by blockchain data. FIG. 2 shows only one blockchain ledger 216. However, there can be a plurality of blockchain ledgers 216 or copies of the blockchain ledger 216 in the blockchain network 212. For example, each node 214 can maintain one blockchain ledger 216 or a copy of the blockchain ledger 216.

It is worthwhile to note that the transaction described in the present specification refers to a piece of data that is created by a user through a client of the blockchain and eventually needs to be published in a distributed database of the blockchain. The transactions in the blockchain can include a transaction in a narrow sense and a transaction in a broad sense. The transaction in a narrow sense refers to the value transfer published to the blockchain by the user. For example, in a conventional bitcoin blockchain network, the transaction can be a transfer initiated by the user in the blockchain. The transaction in a broad sense refers to the business data published to the blockchain by the user with a business intention. For example, an operator can build a consortium blockchain based on an actual business requirement, and deploy, based on the consortium blockchain, other types of online business (such as rental business, vehicle scheduling business, insurance claims business, a credit service, a medical service, etc.) that are not related to value transfer. In this type of consortium blockchain, the transaction can be a business message or a business request with a business intention published by the user in the consortium blockchain.

Blockchains are generally divided into three types: a public blockchain, a private blockchain, and a consortium blockchain. In addition, there are many combinations of these types, such as a private blockchain+a consortium blockchain, and a consortium blockchain+a public blockchain. The public blockchain has the highest degree of decentralization. The public blockchain is represented by bitcoins and Ethereum. Participants joining the public blockchain can read a data record on the blockchain, participate in a transaction, and compete for an accounting right of a new block. In addition, participants (that is, nodes) can be free to join and exit the network, and perform relevant operations. On the contrary, for the private blockchain, write permission of the network is controlled by a certain organization or institution, and read permission of data is regulated by an organization. In short, the private blockchain can be a weakly centralized system that has few strictly limited participation nodes. This type of blockchain is more suitable for a particular institution to use internally. The consortium blockchain is a blockchain between the public blockchain and the private blockchain, which can implement "partial decentralization". Each node in the consortium blockchain usually has its corresponding entity institution or organization. Participants join the network after authentication, and form a consortium of stakeholders to jointly maintain the operation of the blockchain.

Whether the blockchain is the public blockchain, the private blockchain, or the consortium blockchain, based on the present specification, collaboration can be implemented between the blockchain network and an off-chain privacy computing platform. Therefore, secure end-to-end data authorization is implemented between a data owner and a data user. The following describes the technical solutions of the present specification with reference to the implementations.

Figure 3:
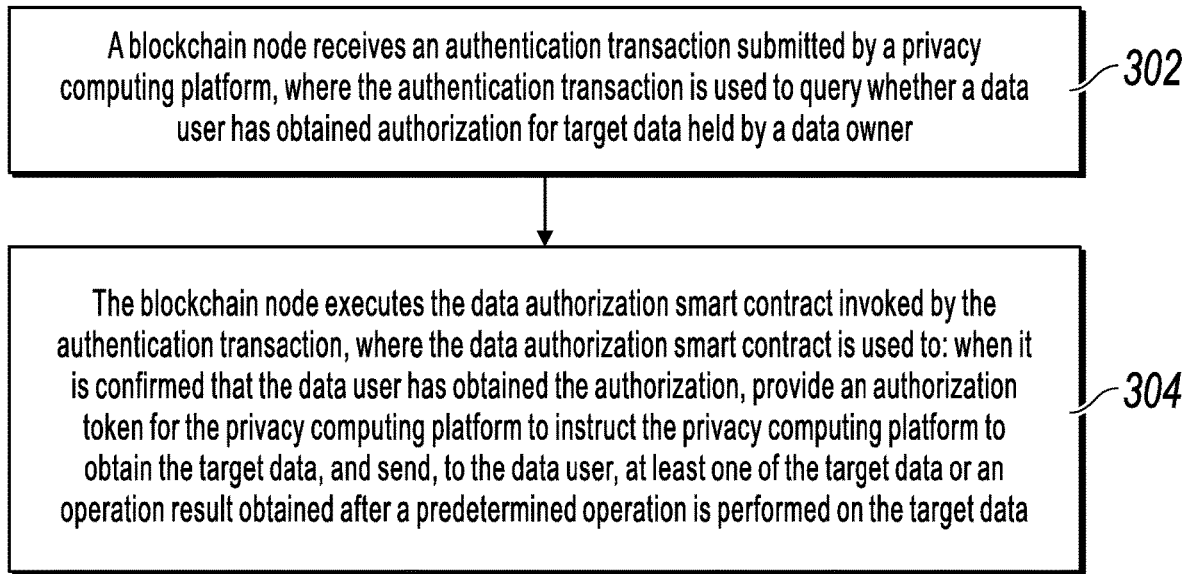
FIG. 3 is a flowchart illustrating a blockchain-based data authorization method, according to an example implementation.

FIG. 3 is a flowchart illustrating a blockchain-based data authorization method, according to an example implementation. As shown in FIG. 3, the method is applied to a blockchain node and can include the following steps:

Step 302: The blockchain node receives an authentication transaction submitted by a privacy computing platform. The authentication transaction is used to query whether a data user has obtained authorization for target data held by a data owner.

The privacy computing platform can directly generate the authentication transaction on the previously described blockchain node; or, the privacy computing platform can generate the authentication transaction on a client, and send the authentication transaction to the previously described blockchain node by using the client; or, after generating the authentication transaction on the client, the privacy computing platform can send the authentication transaction to another blockchain node, and the another blockchain node sends the authentication transaction to the previously described blockchain node. When a consensus is reached for the authentication transaction, the authentication transaction is transmitted to all blockchain nodes in the blockchain network, and the authentication transaction is implemented by each blockchain node.

Although the privacy computing platform can submit the authentication transaction at any time to query an authorization state of the data user to the blockchain node, the operation of the privacy computing platform is usually triggered by the data user. For example, when the data user requests the previous target data from the privacy computing platform, the privacy computing platform submits the authentication transaction to the blockchain node to determine whether the data user has authorization for the target data.

Generally, in the blockchain network using a consensus algorithm such as Proof of Work (POW), Proof of Stake (POS), or Delegated Proof of Stake (DPOS), nodes competing for an accounting right can implement the blockchain transaction after receiving the blockchain transaction. One of the nodes competing for the accounting right can win in the current competition round, and becomes an accounting node. The previous authentication transaction is used as an example. The accounting node can package the authentication transaction with another transaction to generate a new block, and send the generated new block to another node for consensus.

For a blockchain network using a practical *Byzantine* Fault Tolerance (PBFT) mechanism, the node with the accounting right has been agreed upon before the current accounting round. Therefore, after receiving the authentication transaction, the blockchain node can send the authentication transaction to the accounting node if the blockchain node is not the accounting node in the current round. For the accounting node (which can be the previous blockchain node) in the current round, the authentication transaction can be executed either during or before the authentication transaction is packaged to generate a new block, or during or before the authentication transaction is packaged with another transaction to generate the new block. After the accounting node packages the authentication transaction (or packages the authentication transaction with another transactions) to generate the new block, the accounting node sends the generated new block or a block head to another node for consensus.

As previously described, in the blockchain network using a POW mechanism, or in the blockchain network using a POS, DPOS, or and PBFT mechanism, the accounting node in the current round can package the authentication transaction to generate the new block, and send the generated new block and a block head to another node for consensus. If the another node receives the block and determines that the block passes verification, the new block can be added to the end of the original blockchain, thereby completing the accounting process and reaching a consensus. If the authentication transaction is used to invoke a data authorization smart contract, the data authorization smart contract is invoked and executed. The authentication transaction in the block can also be executed when the another node verifies the new block or the block head sent by the accounting node.

Step 304: The blockchain node executes the data authorization smart contract invoked for the authentication transaction. The data authorization smart contract is used to: when it is confirmed that the data user has obtained the authorization, provide an authorization token for the privacy computing platform to instruct the privacy computing platform to obtain the target data, and send, to the data user, at least one of the target data or an operation result obtained after a predetermined operation is performed on the target data.

The blockchain can provide a function of the smart contract no matter whether the blockchain is a public blockchain, a private blockchain, or a consortium blockchain. The smart contract on the blockchain can be triggered by a transaction in blockchain system. The smart contract can be described in the form of codes. The Ethereum is used as an example. The biggest challenge distinguishing the Ethereum from the Bitcoin blockchain technology is that the Ethereum supports the user to create and invoke complex logic in an Ethereum network. The core of a programmable blockchain in the Ethereum is the Ethereum Virtual Machine (EVM). Each Ethereum node can run an EVM. The EVM is a Turing complete virtual machine, which means that complex logic can be implemented through the EVM. The operation of publishing and invoking the smart contract in the Ethereum by the user runs on the EVM.

After the data authorization smart contract is created, the corresponding contract account is formed on the blockchain, and the contract account has a specific contract address. The authentication transaction can include the previous contract address in a field such as the "to" field of the authentication transaction, to invoke the data authorization smart contract. As previously described, after all the blockchain nodes in the blockchain network have reached a consensus, each blockchain node receives the authentication transaction, reads the "to" field of the authentication transaction, and invokes the previous data authorization smart contract. To be specific, the blockchain node reads a code of the data authorization smart contract into the EVM on the blockchain node for execution.

The data authorization smart contract can include a corresponding authorizer list to record information of an authorized object of the data held by the data owner, that is, the information of the authorizer. If it is confirmed based on the data authorization smart contract that the data user is in the authorizer list, it can be determined that the data user has obtained the authorization. All data held by the data owner can be authorized at a time based on a management method of the authorizer list. In addition, the content of the authorizer list is not affected even if the data held by the data owner is increased or decreased, that is, updates of the data held by the data owner is compatible.

When the data authorization smart contract is created, the information of the authorizer list can be written into the contract code. Therefore, the content of the authorizer list cannot be changed. Then, replacement or version iteration may need to be performed on the data authorization smart contract to update the authorizer list. Alternatively, the data authorization smart contract can have one or more corresponding states, and a value of the one or more states can be maintained on the blockchain node. When the value of the state is the information of the authorizer, the one or more states are equivalent to the previous authorizer list. The data owner can submit the blockchain transaction to the blockchain network, and the blockchain transaction can invoke an authorization interface described in the data authorization smart contract. Therefore, the content of the authorizer list can be updated after the data authorization smart contract is executed without performed replacement or version iteration on the data authorization smart contract. Alternatively, the data authorization smart contract can invoke another smart contract, and a code or a state of the another smart contract can be used to record the authorizer list. If the authorizer list is written into the code of the another smart contract and cannot be changed, when the authorizer list needs to be updated, a new smart contract can be created, a code of the new smart contract includes the updated authorizer list, and then the data authorization smart contract invokes a contract address of the new smart contract (the invoked contract address can be used as a state of the data authorization smart contract, and a value of the state can be changed). If the authorizer list is written into the state corresponding to the another smart contract, as previously described, the authorizer list can be updated only by updating the value of the state, and the contract address invoked by the data authorization smart contract does not need to be updated. The contract address can be fixedly written into either the code of the data authorization smart contract or the state of the data authorization smart contract.

The blockchain node can assist the data user in temporarily requesting authorization from the data owner. For example, the data user can submit an authorization request transaction to the blockchain network. The authorization request transaction invokes the request interface described in the previous data authorization smart contract. Therefore, after the blockchain node executes the authorization request transaction, the data authorization smart contract can be written into a transaction log by invoking the request interface described in the data authorization smart contract. Then, the data owner can make a response through an event listening responding mechanism when the previous authorization request event written into the transaction log is listened to For example, when the data user can obtain authorization, the data user can submit an authorization conformation transaction to a blockchain network. The authorization conformation transaction invokes the authorization interface described in the previous data authorization smart contract. Therefore, after the blockchain node executes the authorization conformation transaction, the data user is marked as an authorized data user based on the data authorization smart contract by invoking the authorization interface described in the data authorization smart contract. Then, the data user usually obtains authorization in advance through the previous authorization request transaction before the authentication transaction is submitted. Certainly, the authentication transaction can wait for a predetermined time period during execution so that the data user can submit the previous authorization request transaction within the predetermined time period. For another example, the data user does not need to submit the previous authorization request transaction separately. If the blockchain node determines based on the data authorization smart contract that the data user does not obtain the authorization for the target data in the process of executing the authentication transaction, the authentication transaction can also invoke the request interface of the data authorization smart contract. Therefore, the authorization request event is written into the transaction log based on the data authorization smart contract, and authorization is temporarily requested to the data owner through the previous process. Details are omitted here for simplicity. If the authentication transaction invokes the request interface of the data authorization smart contract, the temporary authorization request process will not require the participation of the data user. In other words, it is transparent to the data user. As such, not only the operation of the data user is simplified, but also the experience of the data user is optimized.

The data user is marked as the authorized data user based on the data authorization smart contract. In one case, the data user can be added to the authorizer list, and the adding process is described previously. Details are omitted here for simplicity. The data held by the data owner can be obtained through the request at any time provided that the data user is in the authorizer list, which means that the data user obtains long-term authorization. In another case, it is confirmed based on the data authorization smart contract that only the current operation of the data user obtains the authorization. In this case, the authorized state of the data user can be cancelled based on the data authorization smart contract after the authorization token is issued. Therefore, the data user needs to request authorization from the data owner again at a next time to obtain the authorization token. The authorizer list belongs to long-term authorization in comparison with the latter case described above. However, it does not necessarily mean permanent authorization. For example, the data owner can remove one or more authorizers by updating the authorizer list so that the one or more authorizers lose the authentication. For another example, each authorizer in the authorizer list can have at least one of specified remaining authorization duration or a specified quantity of remaining authorization times. For example, after the authorization token is issued, at least one of the remaining authorization duration or the quantity of remaining authorization times corresponding to the data user can be decreased based on the data authorization smart contract. In this case, the corresponding authorizer can be automatically removed from the authorizer list when the remaining authorization duration or the quantity of remaining authorization times is cleared, which is equivalent to an "aging" mechanism imposed on the authorizer in the authorizer list.

The data user can include the information of the target data in the authorization request transaction, or the privacy computing platform can include the information of the target data in the authentication transaction. Therefore, the information of the target data can be further written into the authorization request event in the transaction log so that the data owner learns of an authorization range that the data user wishes to obtain. If the authorization request transaction or the authentication transaction does not include any information of the data, it indicates that the data user requests authorization to obtain all the data held by the data owner. Correspondingly, the data owner can add information of the target data to the authorization confirmation transaction to indicate that authorization is granted to the data user for the target data. If the authorization confirmation transaction submitted by the data owner does not include any data information, it indicates that the data owner grants authorization of all the data to the data user. Therefore, in some cases, the information of the target data included in the authentication transaction may be inconsistent with the scope of authorization granted to the data user (that is, which data the data user obtains authentication for). Consequently, the target data cannot be obtained successfully.

The authentication transaction can include description information of the target data, for example, a hash value of the target data or any other description information provided that the description information can indicate the target data. For example, the description information of the target data can be included in the "data" field of a data acquisition transaction. When the authentication transaction invokes the data authorization smart contract, content of the "data" field can be used as input information for the data authorization smart contract. Correspondingly, when the authorization token is generated based on the data authentication smart contract, the description information of the target data can be included in the authorization token so that the authorization token is only used to obtain the target data corresponding to the description information instead of other data. Certainly, the authentication transaction may not include the description information of the target data, and include only information of the data owner instead. Therefore, the correspondingly generated authorization token can be used to obtain any data of the data owner. However, the privacy computing platform obtains the target data specified by the data user based on only the authorization token.

The target data can be stored on the blockchain, for example, a database maintained by the blockchain node. To prevent the target data from leakage, usually, it is necessary to encrypt the target data and then store the encrypted target data. For example, the data owner can submit a depository transaction to the blockchain network. The depository transaction includes the encrypted target data. Therefore, after receiving the depository transaction, the blockchain node can store the encrypted target data included in the depository transaction. The encrypted target data is obtained by encrypting the target data by using a public key of the data owner. Correspondingly, a private key of the data owner can be hosted on the privacy computing platform so that the privacy computing platform can read the encrypted target data from the database maintained by the blockchain node, and decrypt the encrypted data based on the private key of the hosting data owner, to obtain the previous target data. For another example, the data owner can submit a privacy depository transaction to the blockchain network. Transaction content of the privacy depository transaction is in an encrypted state (which can be implemented through symmetric encryption, asymmetric encryption, digital envelope encryption, etc.), and the transaction content includes the target data. Therefore, the blockchain node can decrypt the encrypted transaction content of the privacy depository transaction in a trusted execution environment (TEE) to obtain the transaction content of the privacy depository and obtain the target data, encrypt the target data in the TEE by using the public key of the data owner to obtain the encrypted target data, and store the encrypted target data in the database corresponding to the blockchain node. Correspondingly, the private key of the data owner can be hosted on the privacy computing platform. Therefore, after obtaining the encrypted target data, the privacy computing platform can decrypt the encrypted target data by using the private key, to obtain the previous target data. For still another example, the target data can be generated when the blockchain node executes the blockchain transaction in the TEE (for example, the depository transaction submitted by the data owner), and the blockchain node can encrypt the generated target data in the TEE by using the public key of the data owner to obtain the encrypted target data, and store the encrypted target data in the database corresponding to the blockchain node. Correspondingly, the private key of the data owner can be hosted on the privacy computing platform. Therefore, after obtaining the encrypted target data, the privacy computing platform can decrypt the target data by using the private key.

As described previously, the encryption processing for the target data can be implemented in combination with the TEE. The target data can be any data requested by the data user and held by the data owner. Therefore, any data held by the data owner can be encrypted by using a similar method. The TEE is the secure extension based on CPU hardware and is completely isolated from the outside. The TEE is first put forward by the Global Platform to resolve security isolation of resources on mobile devices. The TEE is parallel to a trusted secure execution environment provided by an operating system for an application. For example, based on the TEE technologies such as Intel Software Protection Extensions (SGX), code execution, remote attestation, secure configuration, secure storage of data, and a trusted path for code execution are isolated. Applications running in the TEE are under security protection, and a third party is almost impossible to access the applications.

The Intel SGX technology is used as an example. By using a processor instruction newly added to the CPU, a part of an enclave page cache (EPC) in a memory can be allocated to the blockchain node, and the blockchain node loads the EVM into the EPC and confirms through remote attestation that the loaded EVM code is consistent with the EVM code at a key management server (for example, through comparing the hash values). After the remote attestation is passed, the blockchain node encrypts the target data by using a memory encryption engine (MEE) in the CPU, and stores the encrypted target data into the EPC. The encrypted content in the EPC can be decrypted into a plaintext only after entering the CPU. In the CPU, the plaintext target data is encrypted to obtain the encrypted target data, and the encrypted target data is stored in the database corresponding to the blockchain node. Similarly, the blockchain node can decrypt the encrypted target data in the TEE. In response to the authentication transaction submitted by the privacy computing platform, the blockchain node can also execute the data authorization smart contract in the TEE to generate the authorization token in the TEE. Therefore, the target data is encrypted in the TEE, the encrypted target data is decrypted in the TEE, and the code of the data authorization smart contract is executed. As such, a secure and reliable environment can be provided, and interference of external factors can be avoided.

In addition to the database in the blockchain node, the target data can further be stored in an off-chain channel by the data owner, and the blockchain node stores only a digital digest of the target data. For example, the digital digest can be a hash value of the target data. Then, the privacy computing platform can obtain the target data from the off-chain channel and provide at least one of the target data or an operation result for the data user.

After obtaining the target data, the privacy computing platform can provide the target data directly to the data user. Alternatively, after obtaining the target data, the privacy computing platform can perform a predetermined operation on the target data and provide the operation result for the data user. The predetermined operation can be any operation desired by the data user. This is not limited in the present specification. For example, when the data user initiates a data acquisition request to the privacy computing platform, required operation rules can be specified in the data acquisition request. After learning the operation rules of the predetermined operation, the privacy computing platform can implement the predetermined operation on the target data based on the operation rules to obtain the corresponding operation result and provide the operation result to the data user. When the corresponding operation result is obtained after the previous predetermined operation is performed on the target data, if the data user cannot derive the value of the target data from the operation result, the data user can be prevented from directly obtaining the target data, while the data acquisition need of the data user is met. Therefore, the following case is avoided: The data user leaks the target data, causing infringement to the right of the data owner. As such, the target data is always held by the data owner.

There can be different privacy levels among the data held by the data owner. Correspondingly, data at different privacy levels can be processed differently. For example, the data owner can hold data at a relatively low privacy level and data at a relatively high privacy level separately, namely, low privacy level data and high privacy level data. Correspondingly, when the target data is at the low privacy level, the target data can be provided for the data user, which means that the data owner does not pay attention to whether the low privacy level data will be leaked; but when the target data is at the high privacy level, the predetermined operation needs to be performed on the target data, and the corresponding operation result is provided for the data user, to ensure that the high privacy level data will not be leaked. If the target data includes both the low and high privacy level data, the low privacy level target data can be provided directly for the data user, and the operation result can be provided to the data user after the predetermined operation is performed on the high privacy level target data. Alternatively, the predetermined operation can be performed on all the target data, and operation results can be provided for the data user.

To protect at least one of the target data or the operation result, the privacy computing platform can transmit at least one of the target data or the operation result through a data channel (for example, an encrypted data channel) established between the privacy computing platform and the data user. Alternatively, the privacy computing platform can encrypt at least one of the target data or the operation result and transmit at least one of the encrypted target data or the encrypted operation result. When the encryption and the transmission are implemented, the privacy computing platform can encrypt at least one of the target data or the operation result by using the public key of the data user and transmit at least one of the encrypted target data or the encrypted operation result to the data user. The data user can decrypt at least one of the encrypted target data or the encrypted operation result by using its private key to obtain at least one of the target data or the operation result in the plaintext form. Alternatively, the previous authorization token can include a temporary session key, and at least one of the target data or the operation result can be encrypted by using the temporary session key, and then at least one of the encrypted target data or the operation result is transmitted by the privacy computing platform to the data user. The authorization token can include a first field and a second field. Content of the first field is obtained by encrypting the temporary session key by using a first key (for example, the public key of the data user) corresponding to the data user, and content of the second field is obtained by encrypting the temporary session key by using a second key (for example, the public key of the privacy computing platform) corresponding to the privacy computing platform. Therefore, the data user and the privacy computing platform can separately decrypt the authorization token to obtain the temporary session key. As such, based on a symmetric encryption scheme, at least one of the target data or the operation result is encrypted, and at least one of the encrypted target data or the encrypted operation result is transmitted.

Figure 4:
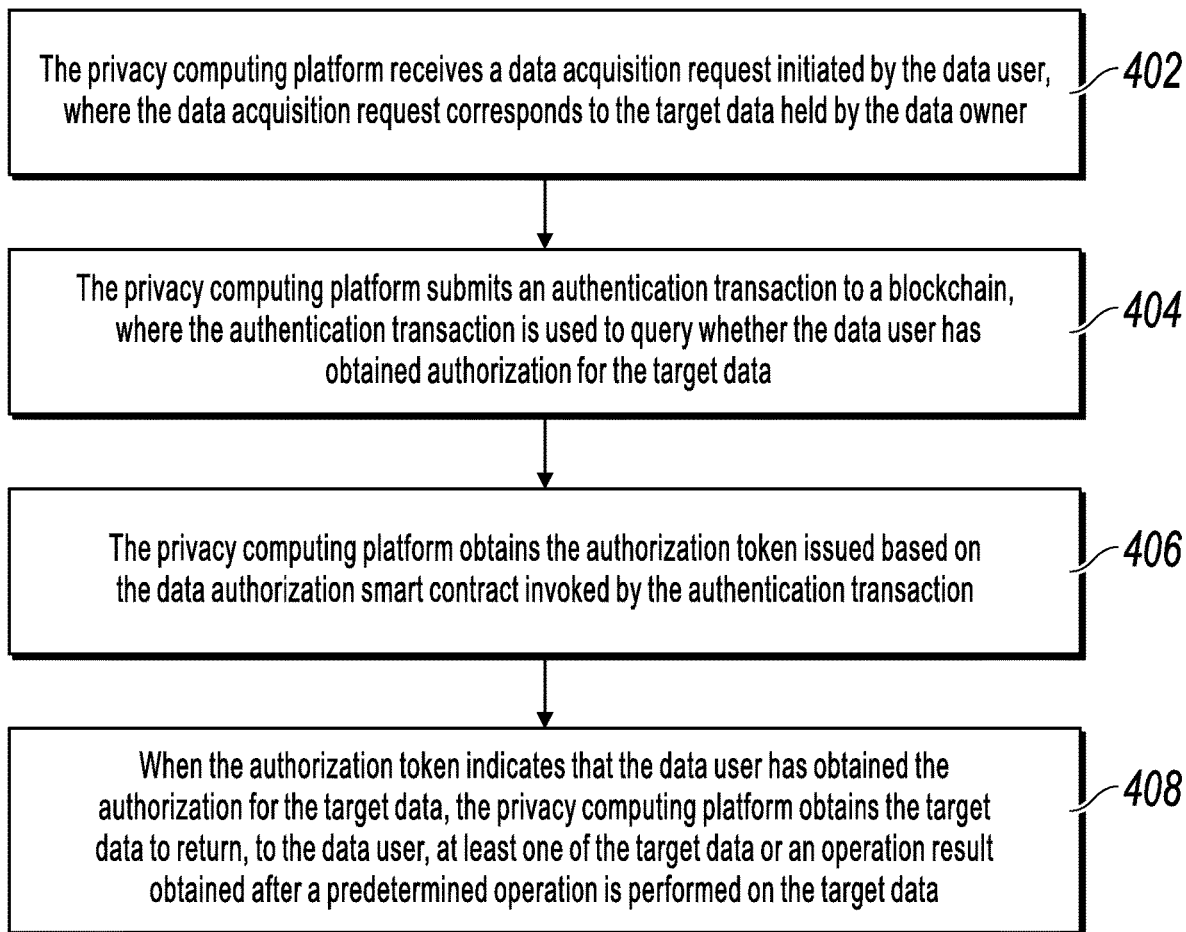
FIG. 4 is a flowchart illustrating another blockchain-based data authorization method, according to an example implementation.

Correspondingly, FIG. 4 is a flowchart illustrating another blockchain-based data authorization method, according to an example implementation. As shown in FIG. 4, the method is applied to a privacy computing platform and can include the following steps:

Step 402: The privacy computing platform receives a data acquisition request initiated by a data user, where the data acquisition request corresponds to target data held by a data owner.

Step 404: The privacy computing platform submits an authentication transaction to a blockchain, where the authentication transaction is used to query whether the data user has obtained authorization for the target data.

As described previously, the data user can request the previous target data from the privacy computing platform, and the privacy computing platform can verify an authorization state of the data user by submitting the authentication transaction to a blockchain network. The privacy computing platform can directly generate the authentication transaction on the previous blockchain node; or, the privacy computing platform can generate the authentication transaction on a client, and send the authentication transaction to the previous blockchain node by using the client; or, after generating the authentication transaction on the client, the privacy computing platform can send the authentication transaction to another blockchain node, and the another blockchain node sends the authentication transaction to the previous blockchain node. When a consensus is reached, the authentication transaction is transmitted to all blockchain nodes in the blockchain network, and the authentication transaction is executed by each blockchain node.

Step 406: The privacy computing platform obtains an authorization token issued based on a data authorization smart contract invoked by the authentication transaction.

Identification or permission verification is performed on the data user by using the data authorization smart contract on the blockchain network. The privacy computing platform only needs to identify the authorization token and does not need to pay attention to the data user's identity or permission. For the process of determining based on the data authentication smart contract whether the data owner has obtained authentication, reference can be made to the implementation shown in FIG. 3. Details are omitted here for simplicity.

Step 408: The privacy computing platform obtains the target data when the authorization token indicates that the data user has obtained the authorization for the target data, to return, to the data user, at least one of the target data or an operation result obtained after a predetermined operation is performed on the target data.

The target data can be stored on a blockchain, for example, stored in a database maintained by the blockchain node. To prevent the target data from leakage, usually, it is necessary to encrypt the target data and then store the encrypted target data. For example, the data owner can submit a depository transaction to the blockchain network. The depository transaction includes the encrypted target data. Therefore, after receiving the depository transaction, the blockchain node can store the encrypted target data included in the depository transaction. The encrypted target data is obtained by encrypting the target data by using a public key of the data owner. Correspondingly, a private key of the data owner can be hosted on the privacy computing platform so that the privacy computing platform can read the encrypted target data from the database maintained by the blockchain node, and decrypt the encrypted data based on the private key of the hosting data owner to obtain the previous target data. For another example, the data owner can submit a privacy depository transaction to the blockchain network. Transaction content of the privacy depository transaction is in an encrypted state (which can be implemented through symmetric encryption, asymmetric encryption, digital envelope encryption, etc.), and the transaction content includes the target data. Therefore, the blockchain node can decrypt the encrypted transaction content of the privacy depository transaction in a trusted execution environment (TEE) to obtain the transaction content of the privacy depository and obtain the target data, encrypt the target data in the TEE by using the public key of the data owner to obtain the encrypted target data, and store the encrypted target data in the database corresponding to the blockchain node. Correspondingly, the private key of the data owner can be hosted on the privacy computing platform. Therefore, after obtaining the encrypted target data, the privacy computing platform can decrypt the encrypted target data by using the private key, to obtain the previous target data. For still another example, the target data can be generated when the blockchain node executes the blockchain transaction in the TEE (for example, the depository transaction submitted by the data owner), and the blockchain node can encrypt the generated target data in the TEE by using the public key of the data owner to obtain the encrypted target data, and store the encrypted target data in the database corresponding to the blockchain node. Correspondingly, the private key of the data owner can be hosted on the privacy computing platform. Therefore, after obtaining the encrypted target data, the privacy computing platform can decrypt the target data by using the private key.

In addition to the database in the blockchain node, the target data can further be stored in an off-chain channel by the data owner, and the blockchain node stores only a digital digest of the target data. For example, the digital digest can be a hash value of the target data. Then, the privacy computing platform can obtain the target data from the off-chain channel and provide at least one of the target data or an operation result for the data user.

After obtaining the target data, the privacy computing platform can provide the target data directly to the data user. Alternatively, after obtaining the target data, the privacy computing platform can perform a predetermined operation on the target data and provide the operation result for the data user. The predetermined operation can be any operation desired by the data user. This is not limited in the present specification. For example, when the data user initiates a data acquisition request to the privacy computing platform, required operation rules can be specified in the data acquisition request. After learning the operation rules of the predetermined operation, the privacy computing platform can implement the predetermined operation on the target data based on the operation rules to obtain the corresponding operation result and provide the operation result to the data user. When the corresponding operation result is obtained after the previous predetermined operation is performed on the target data, if the data user cannot derive the value of the target data from the operation result, the data user can be prevented from directly obtaining the target data, while the data acquisition need of the data user is met. Therefore, the following case is avoided: The data user leaks the target data, causing infringement to the right of the data owner. As such, the target data is always held by the data owner.

There can be different privacy levels among the data held by the data owner. Correspondingly, data at different privacy levels can be processed differently. For example, the data owner can hold data at a relatively low privacy level and data at a relatively high privacy level separately, namely, low privacy level data and high privacy level data. Correspondingly, when the target data is at the low privacy level, the target data can be provided for the data user, which means that the data owner does not pay attention to whether the low privacy level data will be leaked; but when the target data is at the high privacy level, the predetermined operation needs to be performed on the target data, and the corresponding operation result is provided for the data user, to ensure that the high privacy level data will not be leaked. If the target data includes both the low and high privacy level data, the low privacy level target data can be provided directly for the data user, and the operation result can be provided to the data user after the predetermined operation is performed on the high privacy level target data. Alternatively, the predetermined operation can be performed on all the target data, and operation results can be provided for the data user.

To protect at least one of the target data or the operation result, the privacy computing platform can transmit at least one of the target data or the operation result through a data channel (for example, an encrypted data channel) established between the privacy computing platform and the data user. Alternatively, the privacy computing platform can encrypt at least one of the target data or the operation result and transmit at least one of the encrypted target data or the encrypted operation result. When the encryption and the transmission are implemented, the privacy computing platform can encrypt at least one of the target data or the operation result by using the public key of the data user and transmit at least one of the encrypted target data or the encrypted operation result to the data user. The data user can decrypt at least one of the encrypted target data or the encrypted operation result by using its private key to obtain at least one of the target data or the operation result in the plaintext form. Alternatively, the previous authorization token can include a temporary session key, and at least one of the target data or the operation result can be encrypted by using the temporary session key, and then at least one of the encrypted target data or the operation result is transmitted by the privacy computing platform to the data user. The authorization token can include a first field and a second field. Content of the first field is obtained by encrypting the temporary session key by using a first key (for example, the public key of the data user) corresponding to the data user, and content of the second field is obtained by encrypting the temporary session key by using a second key (for example, the public key of the privacy computing platform) corresponding to the privacy computing platform. Therefore, the data user and the privacy computing platform can separately decrypt the authorization token to obtain the temporary session key. As such, based on a symmetric encryption scheme, at least one of the target data or the operation result is encrypted, and at least one of the encrypted target data or the encrypted operation result is transmitted.

It is worthwhile to note that the "data" held by the data owner and requested by the data user in the present specification should be understood as a generalized concept, for example, a value, a word, an image, an audio, a video, a code, a program, or a model (such as an artificial intelligence model). This is not limited in the present specification.

Figure 5:
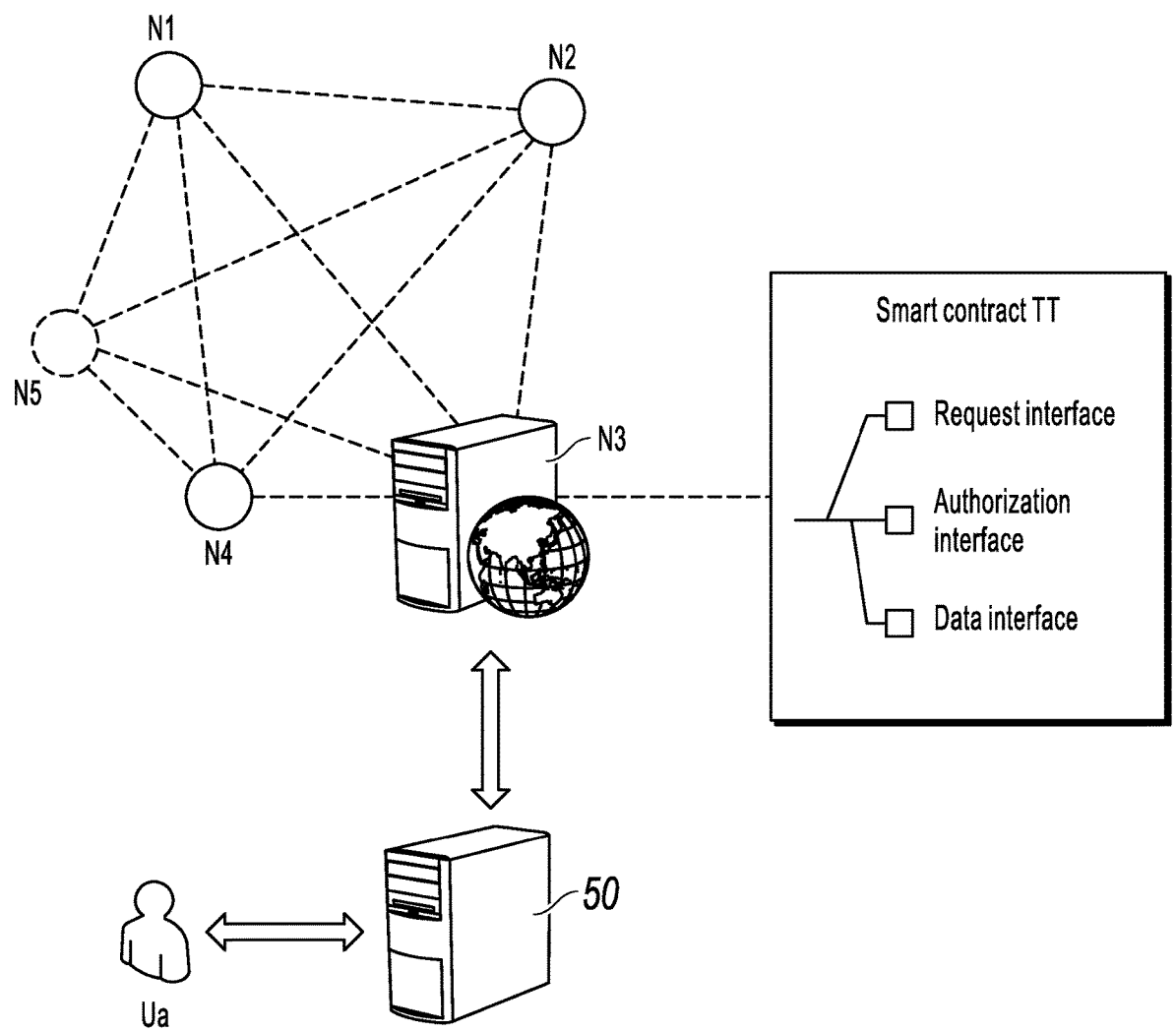
FIG. 5 is a schematic diagram illustrating end-to-end data authorization implemented based on a blockchain network, according to an example implementation.

FIG. 5 is a schematic diagram illustrating end-to-end data authorization implemented based on a blockchain network, according to an example implementation. As shown in FIG. 5, assuming that nodes such as N1, N2, N3, N4 and N5 exist in the blockchain network, the blockchain network can be a consortium blockchain formed by service platforms and several partners. For example, in a supply chain financial scenario, the nodes N1, N2, N4, and N5 correspond directly or indirectly to a plurality of supply chain financial enterprises. The node N3 corresponds to a service platform, and a user can obtain target data of each supply chain financial enterprise based on the service platform or obtain an operation result based on the target data. For another example, in an invoice scenario, the nodes N1, N2, N4, and N5 correspond directly or indirectly to a plurality of merchants, the node N3 corresponds to the service platform, and a user can obtain invoices issued by various merchants, and obtain a part of information in the invoices based on the service platform or an operation result based on the invoice information. Certainly, the technical solution of the present specification can also be applied to other scenarios. This is not limited in the present specification. For ease of understanding, the invoice scenario is used as an example for description.

Figure 6:
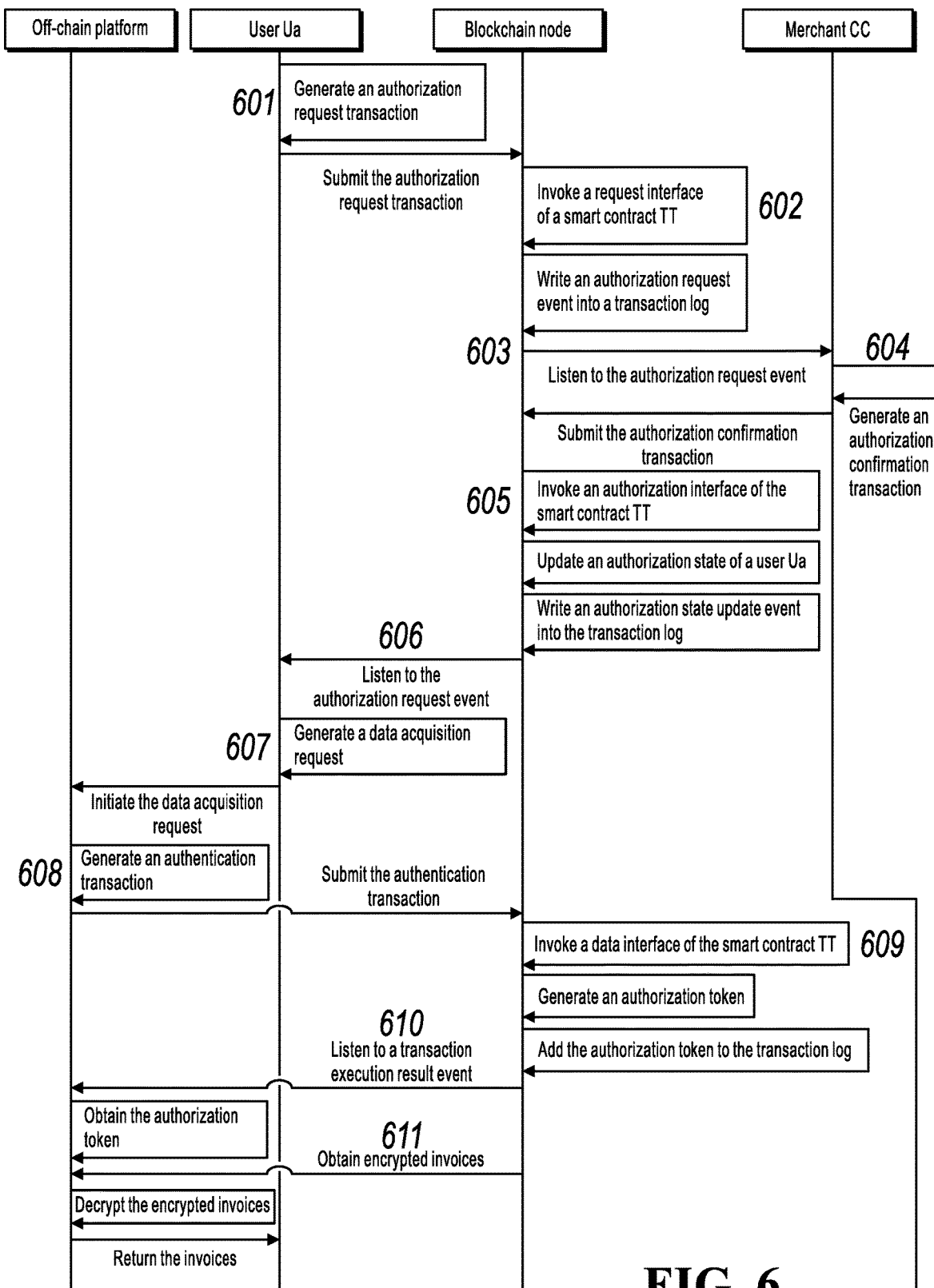
FIG. 6 is an interactive flowchart illustrating end-to-end data authorization implemented based on a blockchain network, according to an example implementation.

Assuming that a user Ua (can be an individual or an institution) wishes to obtain, from a merchant CC, invoices issued within the latest month, based on the technical solution of the present specification, the user Ua can obtain these invoices conveniently and guarantee the security of these invoices. For example, FIG. 6 is an interactive flowchart illustrating end-to-end data authorization implemented based on a blockchain network, according to an example implementation. As shown in FIG. 6, the interactive process between a user Ua, the blockchain node, a merchant CC, and an off-chain platform can include the following steps:

Step 601: The user Ua generates an authorization request transaction and submits the authorization request transaction to the blockchain network.

A client can run on a computing device used by the user Ua, and the authorization request transaction can be generated based on the client and then submitted to the blockchain network. Alternatively, after generating the authorization request transaction on the client, the user Ua can upload the authorization request transaction to a service platform so that the service platform submits the authorization request transaction to the blockchain network. Alternatively, the user Ua can initiate an authorization request to the service platform so that the service platform generates the authorization request transaction and submits the authorization request transaction to the blockchain network.

The purpose of submitting the authorization request transaction to the blockchain network is to request the merchant CC to grant the relevant authorization to the user Ua so that the user Ua can eventually obtain the invoices issued within the latest month. The authorization request transaction can include data description information to describe data that the user Ua wishes to request authorization from the merchant CC separately. For example, the data description information can be used to describe the invoices issued within the latest month by the merchant CC. Correspondingly, the user Ua can obtain authorization of the invoices issued within the latest month by the merchant CC instead of authorization of other data. Alternatively, the authorization request transaction may not include the data description information, which indicates that the user Ua wishes to request authorization for all data separately from the merchant CC. As such, the user Ua obtains authorization for all the data held by the merchant CC, including the invoices issued within the latest month. The data description information included in the authorization request transaction is used as an example to describe subsequent steps.

The authorization request transaction is initially submitted to a certain node in the blockchain network, such as the node N3 or another node shown in FIG. 5. After the authorization request transaction is submitted to the blockchain network, a consensus can be reached between nodes, and after the consensus is reached, the authorization request transaction can be executed on each node. The consensus process can use POW, POS, DPOS, PBFT, or another consensus mechanism in relevant technologies. This is not limited in the present specification.

Step 602: The blockchain node invokes a request interface of the smart contract TT to assist the user Ua in obtaining the data authorization and write an authorization request event into a transaction log.

After reaching the consensus, each node in the blockchain network needs to execute the previous authorization request transaction. When executing the authorization request transaction, the blockchain node invokes the smart contract TT by reading an account address filled in the "to" field for the authorization request transaction. The code of the smart contract TT can logically form a plurality of interfaces to respectively realize different functions, and the interface to be invoked can be specified in the authorization request transaction. For example, when the request interface of the smart contract TT is invoked in the authorization request transaction, relevant authorization can be requested correspondingly.

For example, the authorization request transaction can include the previous data description information, information of the user Ua (for example, a signature of the user Ua), information of the merchant CC (for example, a public key of the merchant CC), etc. Therefore, after the request interface of the smart contract TT is invoked, the authorization request event can be written into the transaction log of the authorization request transaction. Content of the authorization request event can include the previous data description information, the information of the user Ua, the information of the merchant CC, etc., which indicates that the user Ua wishes to obtain the target data corresponding to the data description information from the merchant CC.

Step 603: The merchant CC listens to the authorization request event.

Because operations of all the blockchain nodes are consistent, the merchant CC can learn the previous authorization request event based on event listening mechanism by accessing any corresponding blockchain node, to determine the target data that user Ua wishes to obtain from the merchant CC.

Step 604: The merchant CC generates an authorization confirmation transaction and submits the authorization confirmation transaction to the blockchain network.

When the merchant CC agrees the user Ua to obtain the relevant target data, the authorization confirmation transaction can be generated and submitted separately to indicate that the merchant CC agrees to provide the user Ua with the target data such as the invoices issued within the latest month. The merchant CC is used as an example. The authorization confirmation transaction generated by the merchant CC can include the data description information corresponding to the target data that the merchant CC agrees to provide for the user Ua, the public key of the user Ua, and a signature of merchant CC. Alternatively, the authorization confirmation transaction can include information such as a transaction number of the previous authorization request transaction to indicate that the merchant CC agrees a relevant request of the authorization request transaction.

Step 605: The blockchain node invokes the authorization interface of the smart contract TT, updates an authorization state of the user Ua, and writes an authorization state update event into the transaction log.

As describe previously, the smart contract TT includes several pre-described interfaces. In the authorization confirmation transaction submitted by the merchant CC, the "to" field can include a contract address of the smart contract TT, and can indicate that the authorization interface is expected to be invoked. The code corresponding to the authorization interface is run so that it can be confirmed based on the smart contract TT that the merchant CC agrees to grant authorization of the target data such as the invoices issued within the latest month to the user Ua, separately. Therefore, an authorization state of the user Ua is updated to an authorized state. As describe previously, the authorized state of the user Ua can be recorded in a plurality of forms, depending on rules described in the smart contract TT. Details are omitted here for simplicity.

For update condition of the authorization state of the user Ua, a corresponding authorization state update event can be written into the transaction log based on the smart contract TT, to indicate that the user Ua has obtained the authorization for the invoices issued within the latest month by the merchant CC.

Step 606: The user Ua listens to the authorization state update event.

Similarly to step 603, the user Ua can listen to the transaction log corresponding to the authorization confirmation transaction in the blockchain node based on the event listening mechanism, and determine based on the authorization state update event obtained through listening that the user Ua has obtained authorization for the invoices issued within the latest month by the merchant CC.

Step 607: The user Ua generates a data acquisition request and initiates the data acquisition request to an off-chain platform.

The data acquisition request can include the data description information to describe that the user Ua wishes to obtain, from the merchant CC, the invoices issued within the latest month. Alternatively, the data acquisition request can include the previous transaction number of the authorization request transaction or the previous transaction number of the authorization confirmation transaction, and can also indirectly indicate that the user Ua wishes to obtain, from the merchant CC, the invoices issued within the latest month.

Step 608: The off-chain platform generates an authentication transaction and submits the authentication transaction to the blockchain network.

A client can run on the off-chain platform, and the authentication transaction can be generated based on the client and then submitted to the blockchain network. Alternatively, after generating the authentication transaction on the client, the off-chain platform can upload the authentication transaction to a service platform so that the service platform submits the authentication transaction to the blockchain network. Alternatively, the off-chain platform can initiate an authentication request to the service platform so that the service platform generates the authentication transaction and submits the authentication transaction to the blockchain network.

Step 609: The blockchain node invokes a data interface of the smart contract TT, generates an authorization token, and adds the authorization token to the transaction log.

The data interface of the smart contract TT can be invoked to indicate to the smart contract TT that the user Ua wishes to obtain the invoices issued within the latest month by the merchant CC. Then, the authorization state of the user Ua can be queried based on the smart contract TT.

Figure 7:
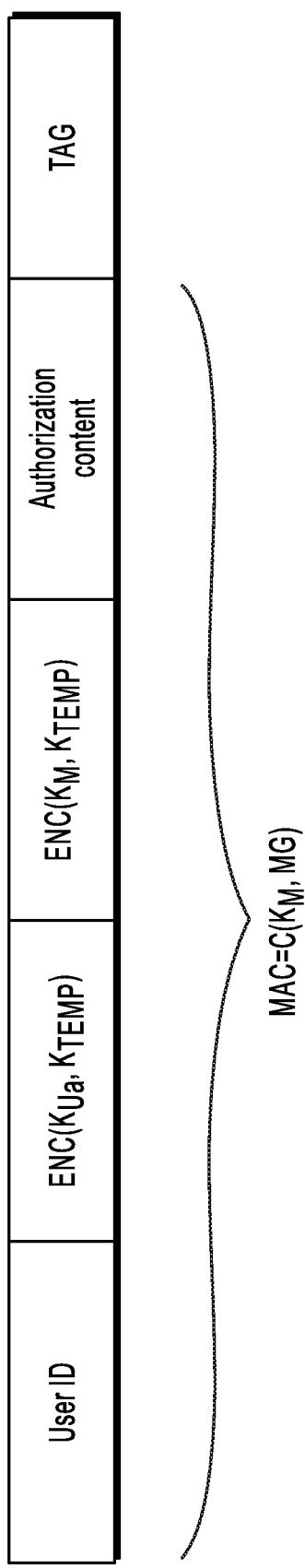
FIG. 7 is a schematic diagram illustrating an authorization token, according to an example implementation.

If the user Ua does not obtain authorization, the transaction can be terminated. If the user Ua has obtained authorization, the authorization token can be generated based on the smart contract TT so that the user Ua can obtain the invoices issued within the latest month by the merchant CC. FIG. 7 is a schematic diagram of an authorization token, according to an example implementation. As shown in FIG. 7, an authorization token can include several fields such as a user ID, ENC ($K_{Ua}$, $K_{TEMP}$), ENC ($K_M$, $K_{TEMP}$), authorization content, a TAG, etc. Certainly, content of the authorization token can vary appropriately with a scenario difference. Details are omitted here for simplicity.

The user ID field can include an ID of a user Ua. If the authorization token is obtained by a user Ub and the user Ub provides the authorization token for the off-chain platform, the chain platform can determine that the authorization token is not verified because the user ID included in the authorization token belongs to the user Ua different from user Ub, namely, the authorization token is invalid. In the previous process, the off-chain platform submits an authentication transaction based on the data acquisition request initiated by the user Ua and obtains the authorization token, which means that the authorization token is provided by the user Ua for the off-chain platform. Because the user ID field of the authorization token includes the ID of the user Ua, it can be determined that the provider of the authorization token is consistent with the authorization token, and the authorization token is valid. In addition, after obtaining the authorization token, the off-chain platform can provide, based on the user ID included in the authorization token, the authorization token for the user corresponding to the user ID. For example, in the implementation shown in FIG. 6, the authorization token should be provided for the user Ua so that the user Ua can obtain a temporary key $K_{TEMP}$ accordingly.

ENC ($K_{Ua}$, $K_{TEMP}$) means an encrypted result obtained after encrypting $K_{Ua}$ and $K_{TEMP}$ by using a predetermined algorithm. $K_{Ua}$ is a key corresponding to the user Ua, and $K_{TEMP}$ is the temporary key generated for the data authorization based on the smart contract TT. $K_{Ua}$ is kept by the user Ua so that the user Ua can decrypt ENC ($K_{Ua}$, $K_{TEMP}$) based on the key $K_{Ua}$ to obtain the temporary key $K_{TEMP}$.

ENC ($K_M$, $K_{TEMP}$) means an encrypted result obtained after encrypting $K_M$ and $K_{TEMP}$ by using a predetermined algorithm. $K_M$ is a key corresponding to the off-chain platform, and $K_{TEMP}$ is the temporary key generated for the data authorization based on the smart contract TT. $K_M$ is kept by the off-chain platform so that the chain platform can decrypt ENC ($K_M$, $K_{TEMP}$) based on the key $K_M$ to obtain the temporary key $K_{TEMP}$.

The authorization content can include the previous data description information to describe data for which the user Ua obtain authorization. For example, in the implementation shown in FIG. 6, authorized content can be the invoices issued within the latest month by the merchant CC.

The TAG field is used to verify content integrity and authenticity of the authorization token. In addition to the TAG field, assuming that content of fields such as the user ID, ENC ($K_{Ua}$, $K_{TEMP}$), ENC ($K_M$, $K_{TEMP}$), and authorization content are all called MG, the content of the TAG field can include MAC=C($K_M$, MG), that is, a Message Authentication Code (MAC) generated based on the key and the content MG. Here, C ( ) represents the adopted generation function. After receiving the authorization token, the off-chain platform can verify, based on the key $K_M$ and the MAC included in the TAG field, other fields included in the authorization token, to determine whether content MG is tampered or the data is lost or damaged during transmission.

Step 610: The off-chain platform listens to a transaction execution result event.

As described previously, the off-chain platform can listen to the transaction log of the data acquisition transaction based on the event listening responding mechanism to obtain the transaction execution result event. If the data acquisition transaction is successfully implemented, the off-chain platform can obtain the authorization token from the transaction execution result event.

Step 611: The off-chain platform obtains encrypted invoices from the blockchain, decrypts the encrypted invoices, and returns the invoices to the user Ua.

The encrypted invoices are stored on the blockchain so that the off-chain platform can access any blockchain node in the blockchain network and obtain the encrypted invoices. Actually, because all the data stored on the blockchain network are in a public state, the platform can randomly access the data stored on the blockchain network. The off-chain platform can even synchronize the data on the blockchain network to the off-chain platform so that after obtaining the previous authorization token, the off-chain platform can directly obtain the encrypted invoices locally without temporarily accessing the blockchain network. As such, a response speed can be accelerated and the waiting time of the user Ua can be shortened.

The invoices can be encrypted by using the public key of the merchant CC to obtain the previous encrypted invoices. The encrypted invoices can be decrypted only by using the private key of the merchant CC. The private key is not in the public state. Therefore, even if the encrypted invoices can be randomly accessed, it can be ensured that the invoices of the merchant CC are in a secure state. To meet a demand of an authorized user for invoices and reduce processing pressure on the merchant CC, the off-chain platform can provide a private key hosting service to the merchant CC. Therefore, the merchant CC can host the private key securely on the off-chain platform, then the off-chain platform can decrypt the encrypted invoice directly and provide the invoices obtained after the decryption to a data user such as the user Ua.

After obtaining the plaintext invoices through decryption, the off-chain platform can encrypt the invoices by using the previous temporary key $K_{TEMP}$ and transmit the encrypted invoices to the user Ua. Correspondingly, the user Ua can use the temporary key $K_{TEMP}$ to decrypt the received transmission data to obtain the invoices issued within the latest month by the merchant CC, thereby ensuring secure data transmission between the off-chain platform and the user Ua.

Figure 8:
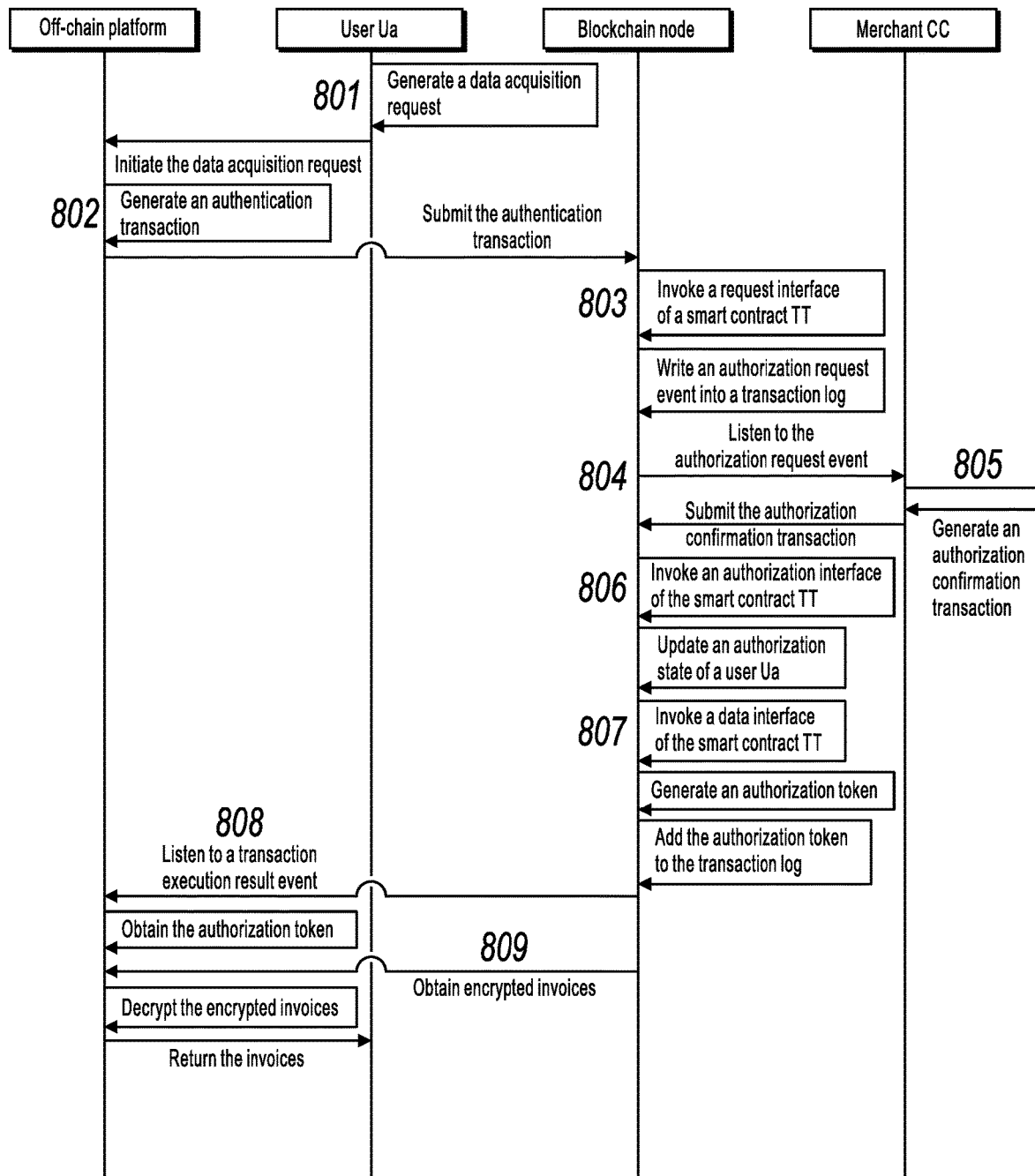
FIG. 8 is an interactive flowchart illustrating another end-to-end data authorization implemented based on a blockchain network, according to an example implementation.

In the implementation shown in FIG. 6, the user Ua needs to submit the authorization request transaction to the blockchain network separately. Therefore, the blockchain node assists the user Ua to obtain authorization from the merchant CC, and then the user Ua initiates the data acquisition request to the off-chain platform to obtain the invoices issued within the latest month by the merchant CC. In another implementation, the related operation of the user Ua can be simplified, and the user Ua can still obtain the invoices issued within the latest month by the merchant CC. Description is provided below with reference to FIG. 8. FIG. 8 is an interactive flowchart illustrating another end-to-end data authorization implemented based on a blockchain network, according to an example implementation. As shown in FIG. 8, the interactive process among a user Ua, a blockchain node, a merchant CC, and an off-chain platform can include the following steps:

Step 801: The user Ua generates a data acquisition request and initiates the data acquisition request to the off-chain platform.

The data acquisition request can include data description information to describe that the user Ua wishes to obtain invoices issued within the latest month by the merchant CC.

Step 802: The off-chain platform generates an authentication transaction and submits the authentication transaction to a blockchain network.

A client can run on the off-chain platform, and the authentication transaction can be generated based on the client and then submitted to the blockchain network. Alternatively, after generating the authentication transaction on the client, the off-chain platform can upload the authentication transaction to a service platform so that the service platform submits the authentication transaction to the blockchain network. Alternatively, the off-chain platform can initiate an authentication request to the service platform so that the service platform generates the authentication transaction and submits the authentication transaction to the blockchain network.

The purpose of submitting the authentication transaction to the blockchain network is to determine whether the user Ua obtains authorization related to the target data requested by the user Ua. If yes, the procedure can skip to step 808, or proceed to step 803.

The authentication transaction is initially submitted to a certain node in the blockchain network, such as the node N3 or another node shown in FIG. 5. After the authentication transaction is submitted to the blockchain network, a consensus can be reached between nodes, and after the consensus is reached, the authentication transaction can be executed on each node. The consensus process can use POW, POS, DPOS, PBFT, or another consensus mechanism in relevant technologies. This is not limited in the present specification.

Step 803: The blockchain node invokes a request interface of the smart contract TT to assist the user Ua in obtaining the data authorization and write an authorization request event into a transaction log.

After reaching the consensus, each node in the blockchain network needs to execute the previous authentication transaction. When executing the authentication transaction, the blockchain node invokes the smart contract TT by reading an account address filled in the "to" field for the authentication transaction. The code of the smart contract TT can logically form a plurality of interfaces to respectively realize different functions, and the interface to be invoked can be specified in the authentication transaction. For example, when the request interface of the smart contract TT is invoked in the authentication transaction, relevant authorization can be requested correspondingly.

For example, the authentication transaction can include the previous data description information, information of the user Ua (for example, a signature of the user Ua), information of the merchant CC (for example, a public key of the merchant CC), etc. Therefore, after the request interface of the smart contract TT is invoked, the authorization request event can be written into the transaction log of the authentication transaction. Content of the authorization request event can include the previous data description information, the information of the user Ua, the information of the merchant CC, etc., which indicates that the user Ua wishes to obtain the target data corresponding to the data description information from the merchant CC instead of authorization of other data. Alternatively, the authorization request event may not include the data description information, which indicates that the user Ua wishes to request authorization for all data separately from the merchant CC. As such, the user Ua obtains authorization for all the data held by the merchant CC, including the invoices issued within the latest month. The data description information included in the authorization request event is used as an example to describe subsequent steps.

Step 804: The merchant CC listens to the authorization request event.

Because operations of all the blockchain nodes are consistent, the merchant CC can learn the previous authorization request event based on event listening mechanism by accessing any corresponding blockchain node, to determine the target data that user Ua wishes to obtain from the merchant CC.

Step 805: The merchant CC generates an authorization confirmation transaction and submits the authorization confirmation transaction to the blockchain network.

When the merchant CC agrees the user Ua to obtain the relevant target data, the authorization confirmation transaction can be generated and submitted separately, to indicate that the merchant CC agrees to provide the user Ua with the target data such as the invoices issued within the latest month. The merchant CC is used as an example. The authorization confirmation transaction generated by the merchant CC can include the data description information corresponding to the target data that the merchant CC agrees to provide for the user Ua, the public key of the user Ua, and a signature of merchant CC. Alternatively, the authorization confirmation transaction can include information such as a transaction number of the previous authorization request transaction, to indicate that the merchant CC agrees a relevant request of the authorization request transaction.

Step 806: The blockchain node invokes the authorization interface of the smart contract TT, updates an authorization state of the user Ua, and writes an authorization state update event into the transaction log.

As describe previously, the smart contract TT includes several pre-described interfaces. In the authorization confirmation transaction submitted by the merchant CC, the "to" field can include a contract address of the smart contract TT, and can indicate that the authorization interface is expected to be invoked. The code corresponding to the authorization interface is run so that it can be confirmed based on the smart contract TT that the merchant CC agrees to grant authorization of the target data such as the invoices issued within the latest month to the user Ua, separately. Therefore, an authorization state of the user Ua is updated to an authorized state. As describe previously, the authorized state of the user Ua can be recorded in a plurality of forms, depending on rules described in the smart contract TT. Details are omitted here for simplicity.

For update condition of the authorization state of the user Ua, a corresponding authorization state update event can be written into the transaction log based on the smart contract TT to indicate that the user Ua has obtained the authorization for the invoices issued within the latest month by the merchant CC.

Step 807: The blockchain node invokes a data interface of the smart contract TT, generates an authorization token, and adds the authorization token to the transaction log.

The authorization token can be generated based on the smart contract TT by invoking the data interface of the smart contract TT. As such, the user Ua can obtain the invoices issued within the latest month by the merchant CC. For a related structure of the authorization token and a meaning and a function of each field, references can be made to the previous description with reference to FIG. 7. Details are omitted here for simplicity.

Step 808: The off-chain platform listens to a transaction execution result event.

As described previously, the off-chain platform can listen to the transaction log of the data acquisition transaction based on the event listening responding mechanism to obtain the transaction execution result event. If the data acquisition transaction is successfully implemented, the off-chain platform can obtain the authorization token from the transaction execution result event.

Step 809: The off-chain platform obtains encrypted invoices from the blockchain, decrypts the encrypted invoices, and returns the invoices to the user Ua.

The encrypted invoices are stored on the blockchain so that the off-chain platform can access any blockchain node in the blockchain network and obtain the encrypted invoices. Actually, because all the data stored on the blockchain network are in a public state, the platform can randomly access the data stored on the blockchain network. The off-chain platform can even synchronize the data on the blockchain network to the off-chain platform so that after obtaining the previous authorization token, the off-chain platform can directly obtain the encrypted invoices locally without temporarily accessing the blockchain network. As such, a response speed can be accelerated and the waiting time of the user Ua can be shortened.

The invoices can be encrypted by using the public key of the merchant CC to obtain the previous encrypted invoices. The encrypted invoices can be decrypted only by using the private key of the merchant CC. The private key is not in the public state. Therefore, even if the encrypted invoices can be randomly accessed, it can be ensured that the invoices of the merchant CC are in a secure state. To meet a demand of an authorized user for invoices and reduce processing pressure on the merchant CC, the off-chain platform can provide a private key hosting service to the merchant CC. Therefore, the merchant CC can host the private key securely on the off-chain platform, then the off-chain platform can decrypt the encrypted invoice directly and provide the invoices obtained after the decryption to a data user such as the user Ua.

After obtaining the plaintext invoices through decryption, the off-chain platform can encrypt the invoices by using the previous temporary key $K_{TEMP}$ and transmit the encrypted invoices to the user Ua. Correspondingly, the user Ua can use the temporary key $K_{TEMP}$ to decrypt the received transmission data to obtain the invoices issued within the latest month by the merchant CC, thereby ensuring secure data transmission between the off-chain platform and the user Ua.

Figure 9:
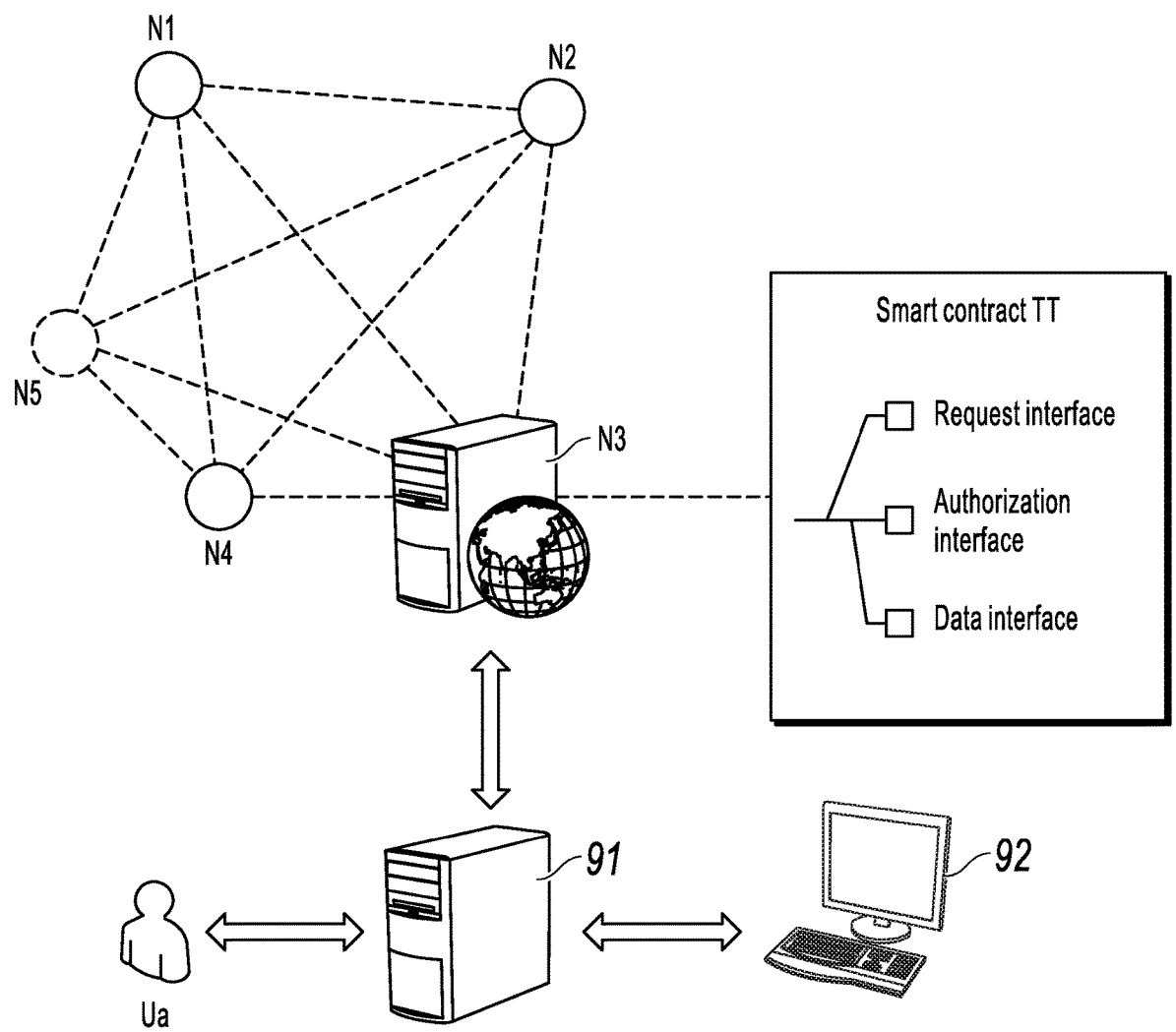
FIG. 9 is a schematic diagram illustrating another end-to-end data authorization implemented based on a blockchain network, according to an example implementation.

In the implementation shown in FIG. 5 to FIG. 8, the data held by the data owner is encrypted by using the public key, and the encrypted data is stored in the blockchain network, for example, in a block (included in the transaction content) or a local database maintained by a blockchain node. The chain platform can directly provide the data user with the data needed by the data user by hosting the private key of the data owner on the off-chain platform. In other implementations, the data owner can store the relevant data in off-chain storage space rather than in the blockchain network. In this case, the off-chain platform needs to trade with the off-chain storage space to obtain corresponding target data. For example, FIG. 9 is a schematic diagram illustrating another end-to-end data authorization implemented based on a blockchain network, according to an exemplary implementation. As shown in FIG. 9, the relevant structure of the blockchain network is similar to that in FIG. 5. Details are omitted here for simplicity. It is assumed that the user Ua wishes to obtain an average invoice amount of invoices issued within last three months by the merchant CC. In this case, there are two methods: (1) The invoices issued within last three months by the merchant CC are provided for the user Ua so that the user Ua calculates the average invoice amount; and (2) the merchant CC calculates the average invoice amount of the invoices issued within the last three months by the merchant CC and provides only the average invoice amount for the user Ua.

The method (1) is similar to the implementations shown in FIG. 5 to FIG. 8, while some differences exist in the interactive process in FIG. 9. As shown in FIG. 9, an off-chain platform 91 can obtain an authorization token through steps 601 to 610 in FIG. 6 or steps 801 to 808 in FIG. 8. An authorization content field of the authorization token describes the invoices issued within the last three months by the merchant CC. Then, the off-chain platform 91 can request chain storage space 92 to obtain the invoices issued within the last three months by the merchant CC. The off-chain storage space 92 can be maintained by the merchant CC or by another object other than the merchant CC. Then, off-chain platform 91 encrypts the invoice data based on the temporary key $K_{TEMP}$ described previously and transmits the encrypted invoice data to the user Ua. After decrypting the invoice data by using the temporary key $K_{TEMP}$, the user Ua can further calculate the obtained invoice data to obtain the corresponding average invoice amount.

The method (2) is much different. As shown in FIG. 9, the user Ua can obtain the authorization token through steps 601 to 610 in FIG. 6 or steps 801 to 808 in FIG. 8. The authorization content field of the authorization token describes the average invoice amount of the invoices issued within the last three months by the merchant CC. Then, the off-chain platform 91 can request the chain storage space 92 to obtain the invoices issued within the last three months by the merchant CC. The off-chain platform 91 calculates the corresponding average invoice amount based on these invoices. Finally, the off-chain platform 91 encrypts the average invoice amount based on the temporary key $K_{TEMP}$ described previously and transmits the encrypted amount to the user Ua. After decrypting the encrypted amount by using the temporary key $K_{TEMP}$, the user Ua can obtain the average invoice amount. Based on the method (2), the user Ua can obtain the value of the average invoice amount, while an invoice amount of each invoice is not exposed to the user Ua. As such, a requirement of the user Ua can be satisfied, and data of the merchant CC can be prevented from leakage. In particular, the user Ua can be prevented from further providing the invoice to another user after obtaining the invoice, thereby ensuring that the data held by the merchant CC is in a secure and controllable state.

The processing method used in the method (2) can also be applied to the implementations shown in FIG. 5 to FIG. 8. For example, the off-chain platform 50 can obtain, from the blockchain network, the encrypted data corresponding to the invoices issued within the last three months by the merchant CC, and decrypt the encrypted data by using the hosted private key to obtain the plaintext invoices. Then the off-chain platform 50 obtains, through calculation, the average invoice amount of invoices issued within the last three months by the merchant CC, and provides the average invoice amount for the user Ua. Therefore, the following case is avoided: The user Ua gets direct access to the invoices issued within the last three months by the merchant CC.

Figure 10:
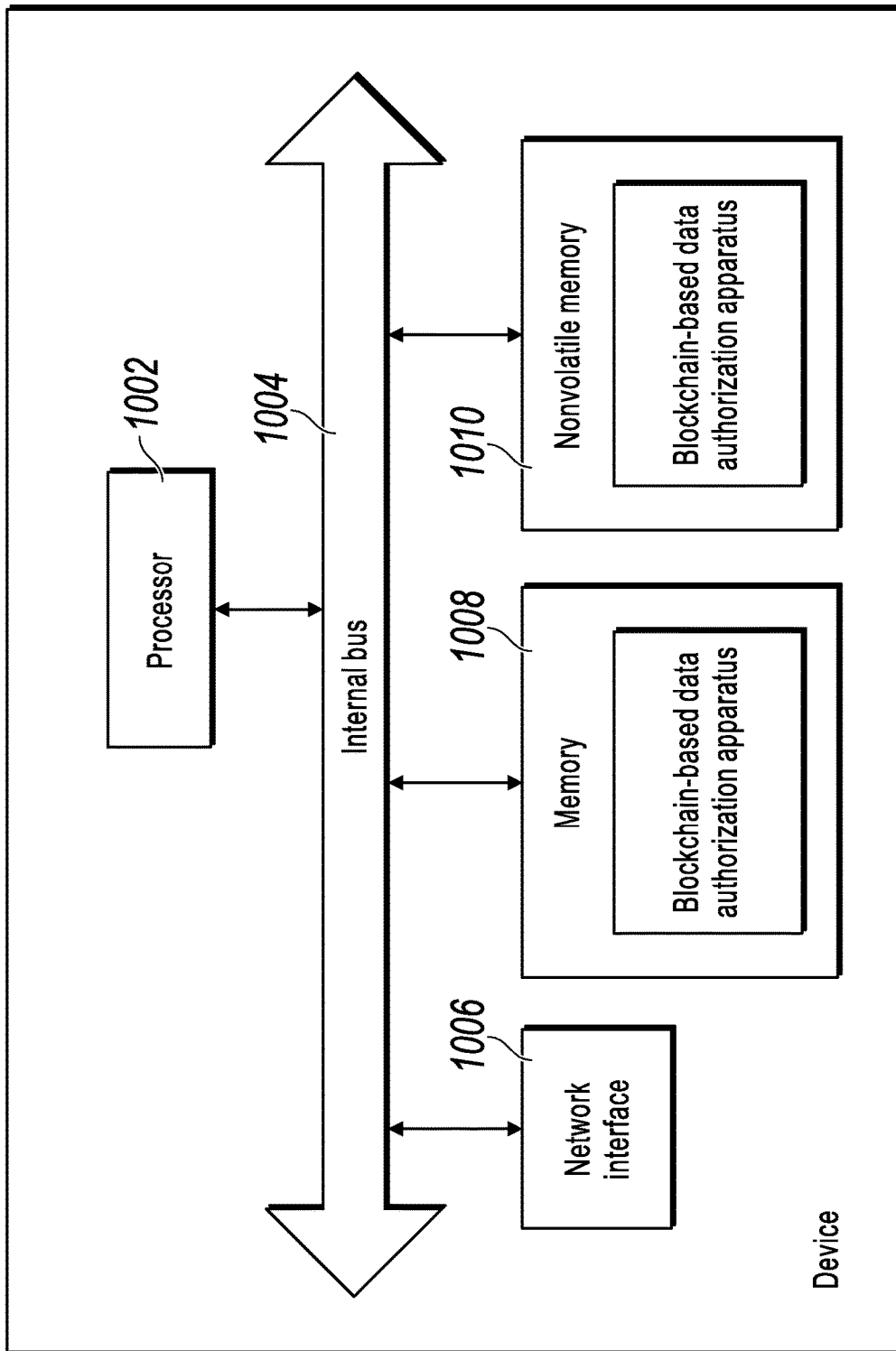
FIG. 10 is a schematic structural diagram illustrating a device, according to an example implementation.

FIG. 10 is a schematic structural diagram illustrating a device, according to an example implementation. With reference to FIG. 10, from a hardware perspective, the device includes a processor 1002, an internal bus 1004, a network interface 1006, a memory 1008 and a non-volatile memory 1010. The device can further include hardware required for other services. The processor 1002 reads a corresponding computer program from the non-volatile memory 1010 to the memory 1008, and runs the computer program. Therefore, a blockchain-based data authorization device is formed from a logical perspective. Certainly, in addition to the software implementation, one or more implementations of the present specification do not preclude other implementations, for example, a logic device or a combination of software and hardware. In other words, the execution entity of the following processing procedure is not limited to each logical unit, and can alternatively be hardware or a logical device.

Figure 11:
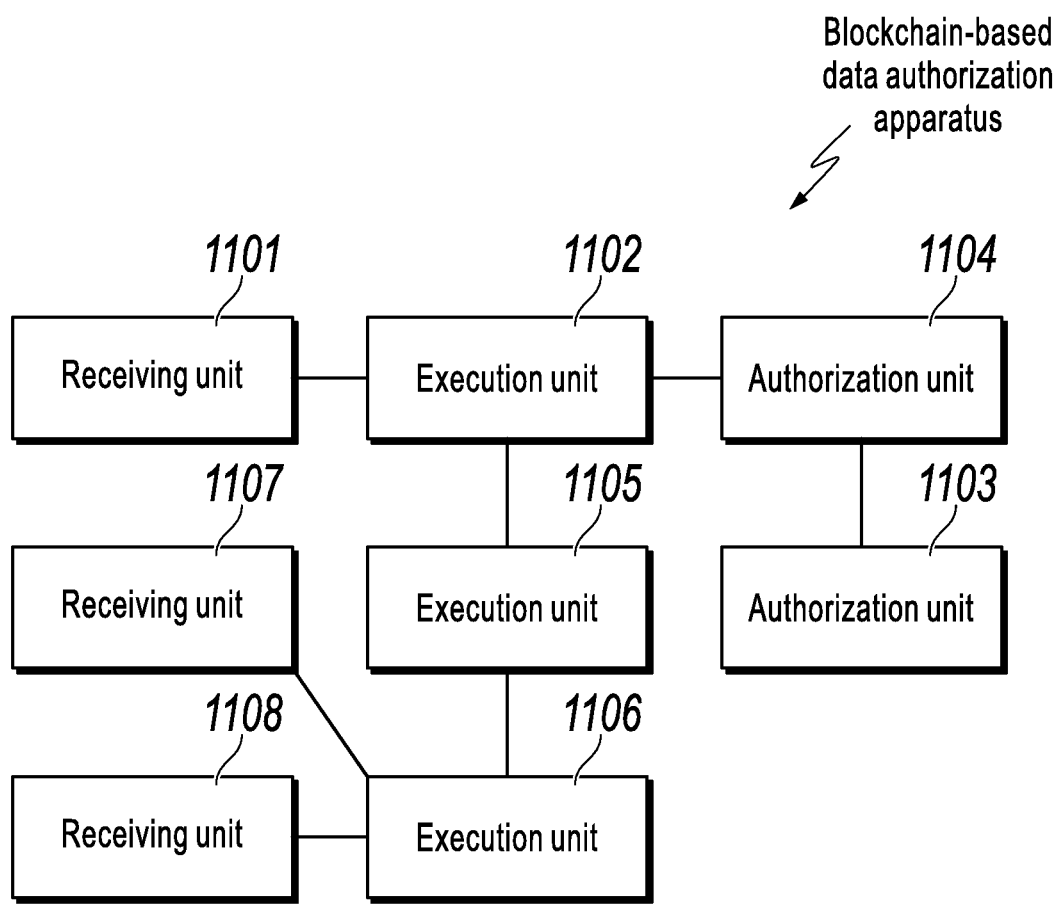
FIG. 11 is a block diagram illustrating a blockchain-based data authorization apparatus, according to an example implementation.

With reference to FIG. 11, in a software implementation, the blockchain-based data authorization apparatus can include the following: a receiving unit 1101, configured to enable a blockchain node to receive an authentication transaction submitted by a privacy computing platform, where the authentication transaction is used to query whether a data user has obtained authorization for target data held by a data owner; and an execution unit 1102, configured to enable the blockchain node to execute a data authorization smart contract invoked for the authentication transaction, where the data authorization smart contract is used to: when it is confirmed that the data user has obtained the authorization, provide an authorization token for the privacy computing platform to instruct the privacy computing platform to obtain the target data, and send, to the data user, at least one of the target data or an operation result obtained after a predetermined operation is performed on the target data.

Optionally, the data authorization smart contract corresponds to an authorizer list, and when it is confirmed that the data user is in the authorizer list, it is confirmed based on the data authorization smart contract that the data user has obtained the authorization.

Optionally, the apparatus further includes the following: a requesting unit 1103, configured to enable the blockchain node to invoke a request interface described in the data authorization smart contract, so that an authorization request event is written into a transaction log based on the data authorization smart contract for the data owner to listen; and an authorization unit 1104, configured to enable the blockchain node to invoke, based on an authorization confirmation transaction submitted by the data owner, an authorization interface described in the data authorization smart contract so that it is confirmed based on the data authorization smart contract that the data user has obtained the authorization.

Optionally, the requesting unit 1103 is configured to: enable the blockchain node to invoke the request interface described in the data authorization smart contract in response to the authentication transaction; or enable the blockchain node to invoke the request interface described in the data authorization smart contract based on an authorization request transaction submitted by the data user.

Optionally, the data authorization smart contract is further used to cancel an authorized state of the data user after the authorization token is issued; or the data authorization smart contract is further used to decrease a quantity of remaining authorization times corresponding to the data user after the authorization token is issued.

Optionally, when the target data is at a low privacy level, the target data is provided for the data user; when the target data is at a high privacy level, the predetermined operation is performed on the target data so that a corresponding operation result is provided for the data user.

Optionally, the apparatus further includes the following: a storage unit 1105, configured to enable the blockchain node to store encrypted target data included in a depository transaction after the depository transaction is received, where the encrypted target data is obtained after the target data is encrypted by using a public key of the data owner, and a private key of the data owner is hosted on the privacy computing platform so that the privacy computing platform decrypts the encrypted target data after obtaining the encrypted target data, to obtain the target data.

Optionally, the apparatus further includes the following: an encryption unit 1106, configured to enable the blockchain node to encrypt the target data in a trusted execution environment by using the public key of the data owner to obtain encrypted target data, to store the encrypted target data in a database corresponding to the blockchain node, where a private key of the data owner is hosted on the privacy computing platform so that the privacy computing platform decrypts the encrypted target data after obtaining the encrypted target data, to obtain the target data.

Optionally, the apparatus further includes the following: a decryption unit 1107, configured to enable the blockchain node to decrypt a privacy depository transaction in the trusted execution environment after the privacy depository transaction submitted by the data owner is received, to obtain the target data included in the transaction content; or a generating unit 1108, configured to enable the blockchain node to execute corresponding transaction content in the trusted execution environment after a depository transaction submitted by the data owner is received, to generate the target data.

Optionally, the blockchain node stores a digital digest of the target data, the target data is stored in an off-chain channel by the data owner, and the target data is obtained by the privacy computing platform from the off-chain channel.

Optionally, the authorization token includes a temporary session key, and at least one of encrypted target data or an encrypted operation result is transmitted by the privacy computing platform to the data user after at least one of the target data or the operation result is encrypted by using the temporary session key.

Optionally, the authorization token includes a first field and a second field, content of the first field is obtained by encrypting the temporary session key by using a first key corresponding to the data user, and content of the second field is obtained by encrypting the temporary session key by using a second key corresponding to the privacy computing platform.

Figure 12:
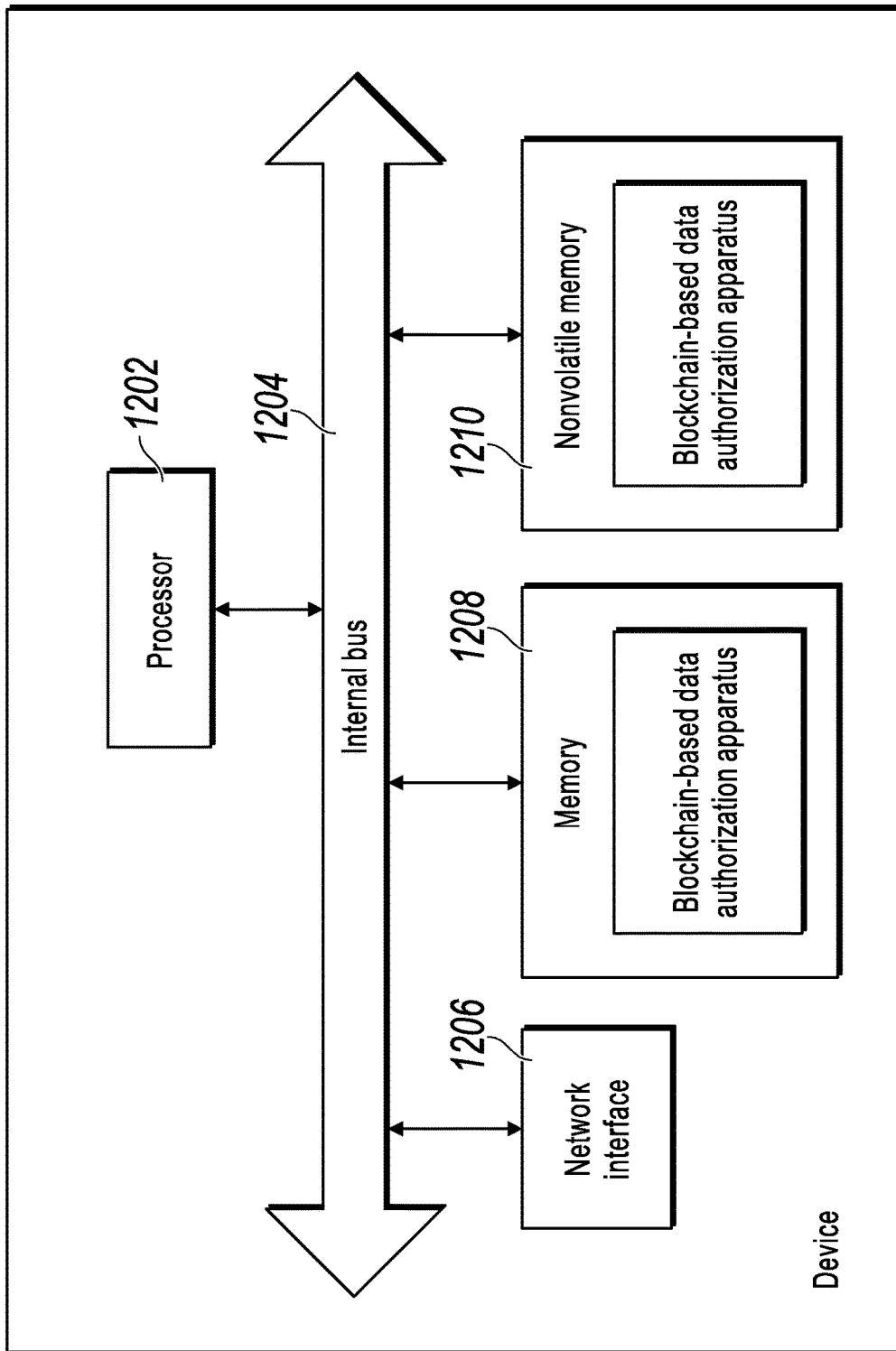
FIG. 12 is a schematic structural diagram illustrating another device, according to an example implementation.

FIG. 12 is a schematic structural diagram illustrating a device, according to an example implementation. With reference to FIG. 12, from a hardware perspective, the device includes a processor 1202, an internal bus 1204, a network interface 1206, a memory 1208 and a non-volatile memory 1210. The device can further include hardware required for other services. The processor 1202 reads a corresponding computer program from the non-volatile memory 1210 to the memory 1208, and runs the computer program. Therefore, a blockchain-based data authorization device is formed from a logical perspective. Certainly, in addition to the software implementation, one or more implementations of the present specification do not preclude other implementations, for example, a logic device or a combination of software and hardware. In other words, the execution entity of the following processing procedure is not limited to each logical unit, and can alternatively be hardware or a logical device.

Figure 13:
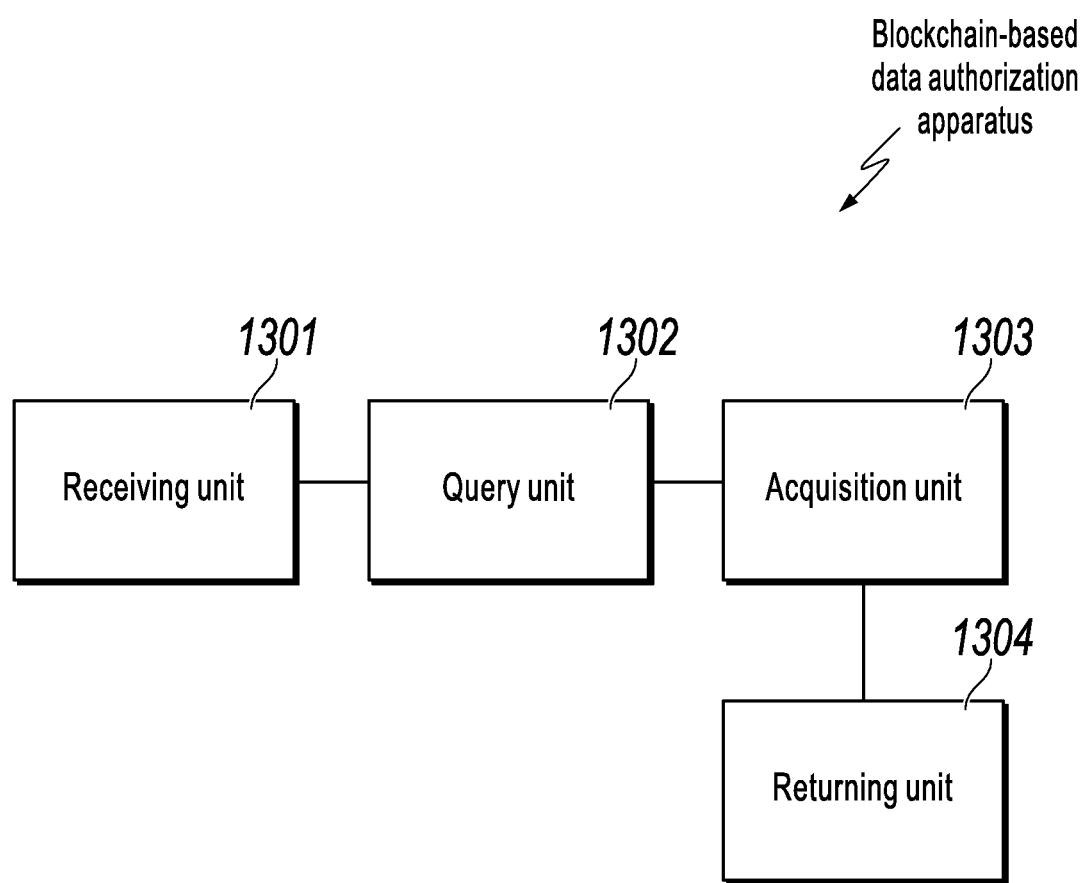
FIG. 13 is a block diagram illustrating another blockchain-based data authorization apparatus, according to an example implementation.

With reference to FIG. 13, in a software implementation, the blockchain-based data authorization apparatus can include the following: a receiving unit 1301, configured to enable a privacy computing platform to receive a data acquisition request initiated by a data user, where the data acquisition request corresponds to target data held by a data owner; a query unit 1302, configured to enable the privacy computing platform to submit an authentication transaction to a blockchain, where the authentication transaction is used to query whether the data user has obtained authorization for the target data; an acquisition unit 1303, configured to enable the privacy computing platform to obtain an authorization token issued based on a data authorization smart contract invoked by the authentication transaction; and a returning unit 1304, configured to enable the privacy computing platform to obtain the target data when the authorization token indicates that the data user has obtained the authorization for the target data, to return, to the data user, at least one of the target data or an operation result obtained after a predetermined operation is performed on the target data.

Optionally, the returning unit 1304 is configured to: enable the privacy computing platform to obtain encrypted target data from a blockchain node, where the encrypted target data is obtained after the target data is encrypted by using a public key of the data owner; and enable the privacy computing platform to decrypt the encrypted target data by using a hosted private key of the data owner, to obtain the target data.

Optionally, a blockchain node stores a digital digest of the target data, and the target data is stored in an off-chain channel by the data owner; and the returning unit 1304 is configured to: enable the privacy computing platform to provide the digital digest of the target data for the off-chain channel; and enable the privacy computing platform to receive the target data returned by the off-chain channel.

The system, apparatus, module or unit illustrated in the previous implementations can be specifically implemented by a computer chip or entity, or can be implemented by a product having a function. A typical implementation device is a computer. The computer can be in the form of a personal computer, a laptop computer, a cellular phone, a camera phone, a smart phone, a personal digital assistant, a media player, a navigation device, an e-mail transceiver, a game console, a tablet computer, a wearable device, or any combination of several of these devices.

In a typical configuration, the computer includes one or more central processing unit (CPU), input/output interfaces, network interfaces, and memories.

The memory can include a non-permanent memory in a computer-readable medium, a random access memory (RAM) and/or a non-volatile memory, for example, a read-only memory (ROM) or a flash memory (flash RAM). The memory is an example of a computer-readable medium.

The computer-readable media includes permanent and non-permanent media, and removable and non-removable media. Information storage can be implemented by using any method or technology. Information can be a computer readable instruction, a data structure, a program module, or other data. Examples of the computer storage medium include, but are not limited to, a phase change memory (PRAM), a static random access memory (SRAM), a dynamic random access memory (DRAM), another type of RAM, a ROM (ROM), an electrically erasable programmable ROM (EEPROM), a flash memory or another memory technology, a compact disc ROM (CD-ROM), a digital versatile disk (DVD) or another optical storage, a magnetic cassette, a magnetic disk storage, a quantum storage, a graphene-based storage medium, another magnetic storage device, or any other non-transmission medium. The computer storage medium can be used to store information accessible to a computing device. As described in the present application, the computer-readable medium does not include transitory computer readable media, such as a modulated data signal and carrier.

It is worthwhile to note that the term "include", "comprise", or their any other variant is intended to cover non-exclusive inclusion so that processes, methods, commodities, or devices that include a list of elements include not only those elements but also other elements that are not explicitly listed, or elements inherent in such processes, methods, commodities, or devices. Without more constraints, an element preceded by "includes a . . . " does not preclude the existence of additional identical elements in the process, method, article, or device that includes the element.

The specific implementations of the present specification are described in the above. Other implementations are within the scope of the appended claims. In some cases, the actions or steps described in the claims can be performed in an order different from that in the implementations and can still achieve the desired results. In addition, the process depicted in the accompanying drawings is not necessarily shown in a particular order to achieve the desired results. In some implementations, multi-task processing and parallel processing are also possible or can be advantageous.

The terms used in one or more implementations of the present specification are only for the purpose of describing a particular implementation and are not intended to limit one or more implementations of the present specification. The singular forms "one", "said" and "the" used in one or more implementations of the present specification and the appended claims are also intended to include most forms unless the context clearly indicates other meanings. It should also be understood that the term "and/or" used in the present specification refers to any possible combination or all possible combinations of one or more associated listed items.

It should be understood that, although the terms first, second and third may be used in one or more implementations of the present specification to describe a variety of information, such information should not be limited to those terms. These terms are used only to distinguish between the same type of information. For example, without departing from the scope of one or more implementations of the present specification, first information can also be referred to as second information, and similarly, second information can also be referred to as first information. Depending on the context, for example, the term "if" used here can be interpreted as "in", "when", or "in response to determining".

The previous descriptions are merely preferred implementations of one or more implementations of the present specification, and are not intended to limit one or more implementations of the present specification. Any modification, equivalent replacement, improvement, etc. made within the spirit and principles of one or more implementations of the present specification shall be included within the scope of the protection of one or more implementations of the present specification.

What is claimed is:

1. A blockchain-based data authorization method, comprising:
   receiving, by a blockchain node, an authentication transaction submitted by a privacy computing platform, wherein the authentication transaction queries whether a data user has obtained authorization of target data possessed by a data owner;
   invoking, by the blockchain node, a request interface defined in a smart contract, wherein an authorization request event is written into a transaction log in response to invoking the request interface, and wherein the transaction log is monitored by the data owner;
   in response to invoking the request interface, invoking, by the blockchain node, an authorization interface defined in the smart contract based on an authorization confirmation transaction submitted by the data owner in response to the authorization request event being written into the transaction log, wherein the authorization interface defined in the smart contract is configured to authorize the data user;
   updating, by the blockchain node, an authorization state of the data user based on the authorization interface defined in the smart contract; and
   in response to updating the authorization state of the data user, executing, by the blockchain node, the smart contract invoked by the authentication transaction to provide an authorization token to the privacy computing platform that instructs the privacy computing platform to obtain the target data, and send a computational result of one or more predetermined computational operations based on the target data to the data user.

2. The method according to claim 1, wherein the smart contract comprises a list of authorized users including the data user.

3. The method according to claim 1, wherein the request interface is invoked in response to receiving the authentication transaction.

4. The method according to claim 1, wherein the authorization token indicates a quantity of authorizations the data user has over the target data and the smart contract includes one or more instructions to reduce the quantity of authorizations the data user has until the data user no longer has authorization.

5. The method according to claim 1, wherein the smart contract is executed to provide the target data to the data user if the target data has low data privacy level, and the smart contract is executed to provide computational result of the one or more predetermined computational operations if the target data has high data privacy level.

6. The method according to claim 1, further comprising:
   receiving, by the blockchain node, a depository transaction that includes ciphertext of the target data generated by encrypting the target data using a public key associated with the data owner; and
   storing, by the blockchain node, the ciphertext of the target data, wherein the privacy computing platform hosts a private key corresponding to the public key for decrypting the ciphertext of the target data.

7. The method according to claim 1, further comprising:
   encrypting, by the blockchain node, the target data in a trusted execution environment (TEE) by using a public key associated with the data owner to obtain ciphertext of the target data; and
   storing, by the blockchain node, the ciphertext of the target data to a database associated with the blockchain node, and wherein the privacy computing platform hosts a private key corresponding to the public key associated with the data owner for decrypting the ciphertext of the target data.

8. The method according to claim 7, further comprising:
   wherein a data acquisition transaction is a ciphertext of a privacy depository transaction, and executing the smart contract further comprises:
   decrypting the ciphertext in the TEE to obtain the target data.

9. The method according to claim 1, wherein the blockchain node stores a digital digest of the target data, the target data is stored by the data owner in a storage media other than a blockchain, and is retrieved by another smart contract from the storage media and transferred to the smart contract to perform the one or more predetermined computational operations.

10. The method according to claim 1, wherein the authorization token comprises a temporary session key, and at least one of the target data or the computational result is encrypted to ciphertext by using the temporary session key and transmitted to the data user through the privacy computing platform.

11. The method according to claim 10, wherein the authorization token comprises a first field and a second field, and wherein the first field includes ciphertext of the temporary session key encrypted by using an encryption key associated with the data user, and the second field includes ciphertext of the temporary session key encrypted by using an encryption key associated with the privacy computing platform.

12. A non-transitory, computer-readable medium storing one or more instructions executable by a computer system to perform operations comprising:

receiving, by a blockchain node, an authentication transaction submitted by a privacy computing platform, wherein the authentication transaction queries whether a data user has obtained authorization of target data possessed by a data owner;

invoking, by the blockchain node, a request interface defined in a smart contract, wherein an authorization request event is written into a transaction log in response to invoking the request interface, and wherein the transaction log is monitored by the data owner;

in response to invoking the request interface, invoking, by the blockchain node, an authorization interface defined in the smart contract based on an authorization confirmation transaction submitted by the data owner in response to the authorization request event being written into the transaction log, wherein the authorization interface defined in the smart contract is configured to authorize the data user;

updating, by the blockchain node, an authorization state of the data user based on the authorization interface defined in the smart contract; and in response to updating the authorization state of the data user, executing, by the blockchain node, the smart contract invoked by the authentication transaction to provide an authorization token to the privacy computing platform that instructs the privacy computing platform to obtain the target data, and send a computational result of one or more predetermined computational operations based on the target data to the data user.

13. The medium according to claim 12, wherein the smart contract comprises a list of authorized users including the data user.

14. The medium according to claim 12, wherein the request interface is invoked in response to receiving the authentication transaction.

15. The medium according to claim 12, wherein the authorization token indicates a quantity of authorizations the data user has over the target data and the smart contract includes one or more instructions to reduce the quantity of authorizations the data user has until the data user no longer has authorization.

16. The medium according to claim 12, wherein the smart contract is executed to provide the target data to the data user if the target data has low data privacy level, and the smart contract is executed to provide computational result of the one or more predetermined computational operations if the target data has high data privacy level.

17. The medium according to claim 12, wherein the operations comprise:

receiving, by the blockchain node, a depository transaction that includes ciphertext of the target data generated by encrypting the target data using a public key associated with the data owner; and storing, by the blockchain node, the ciphertext of the target data, wherein the privacy computing platform hosts a private key corresponding to the public key for decrypting the ciphertext of the target data.

18. A computer-implemented system comprising:

one or more processors; and one or more computer-readable memories coupled to the one or more processors and having instructions stored thereon that are executable by the one or more processors to perform one or more operations comprising:

receiving, by a blockchain node, an authentication transaction submitted by a privacy computing platform, wherein the authentication transaction queries whether a data user has obtained authorization of target data possessed by a data owner;

invoking, by the blockchain node, a request interface defined in a smart contract, wherein an authorization request event is written into a transaction log in response to invoking the request interface, and wherein the transaction log is monitored by the data owner;

in response to invoking the request interface, invoking, by the blockchain node, an authorization interface defined in the smart contract based on an authorization confirmation transaction submitted by the data owner in response to the authorization request event being written into the transaction log, wherein the authorization interface defined in the smart contract is configured to authorize the data user;

updating, by the blockchain node, an authorization state of the data user based on the authorization interface defined in the smart contract; and in response to updating the authorization state of the data user, executing, by the blockchain node, the smart contract invoked by the authentication transaction to provide an authorization token to the privacy computing platform that instructs the privacy computing platform to obtain the target data, and send a computational result of one or more predetermined computational operations based on the target data to the data user.

* * * * *